United States Patent
Hattori

(10) Patent No.: US 7,843,617 B2
(45) Date of Patent: Nov. 30, 2010

(54) INFORMATION PROCESSING DEVICE, INFORMATION PROCESSING METHOD, AND INFORMATION PROCESSING SYSTEM

(75) Inventor: Yasuhiro Hattori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 863 days.

(21) Appl. No.: 11/686,610

(22) Filed: Mar. 15, 2007

(65) Prior Publication Data

US 2007/0229922 A1  Oct. 4, 2007

(30) Foreign Application Priority Data

Mar. 17, 2006 (JP) ............... 2006-075641
Mar. 7, 2007 (JP) ............... 2007-057883

(51) Int. Cl.
*H04N 1/46* (2006.01)
*G06K 15/00* (2006.01)

(52) U.S. Cl. ............... 358/537; 358/1.9; 358/1.16; 358/1.18

(58) Field of Classification Search ............... 358/537, 358/1.9, 1.16, 1.18; 382/232, 233, 240, 245, 382/246, 250; 345/1.1, 543; 375/240.01; 707/104.1

See application file for complete search history.

(56) References Cited

U.S. PATENT DOCUMENTS

| 7,526,134 B2 * | 4/2009 | Matsubara | 382/232 |
| 2003/0030650 A1 | 2/2003 | Ishizuka | |
| 2006/0004867 A1 * | 1/2006 | Tamai et al. | 707/104.1 |

FOREIGN PATENT DOCUMENTS

JP  2003-51907  2/2003

* cited by examiner

*Primary Examiner*—Charlotte M Baker
(74) *Attorney, Agent, or Firm*—Oblon, Spivak, McClelland, Maier & Neustadt, L.L.P.

(57) ABSTRACT

An information processing device includes a controller unit that controls overall operations of the information processing device. The information processing device also includes an operational unit that serves as a user interface. The controller unit includes a memory that stores one or more is image files to be transmitted to the operational unit. The controller unit also includes a first calculation and processing unit that controls the overall operations of the information processing device. An output image of the image files after a processing is produced in the operational unit. In addition, the output image is displayed on a display device of the operational unit.

19 Claims, 31 Drawing Sheets

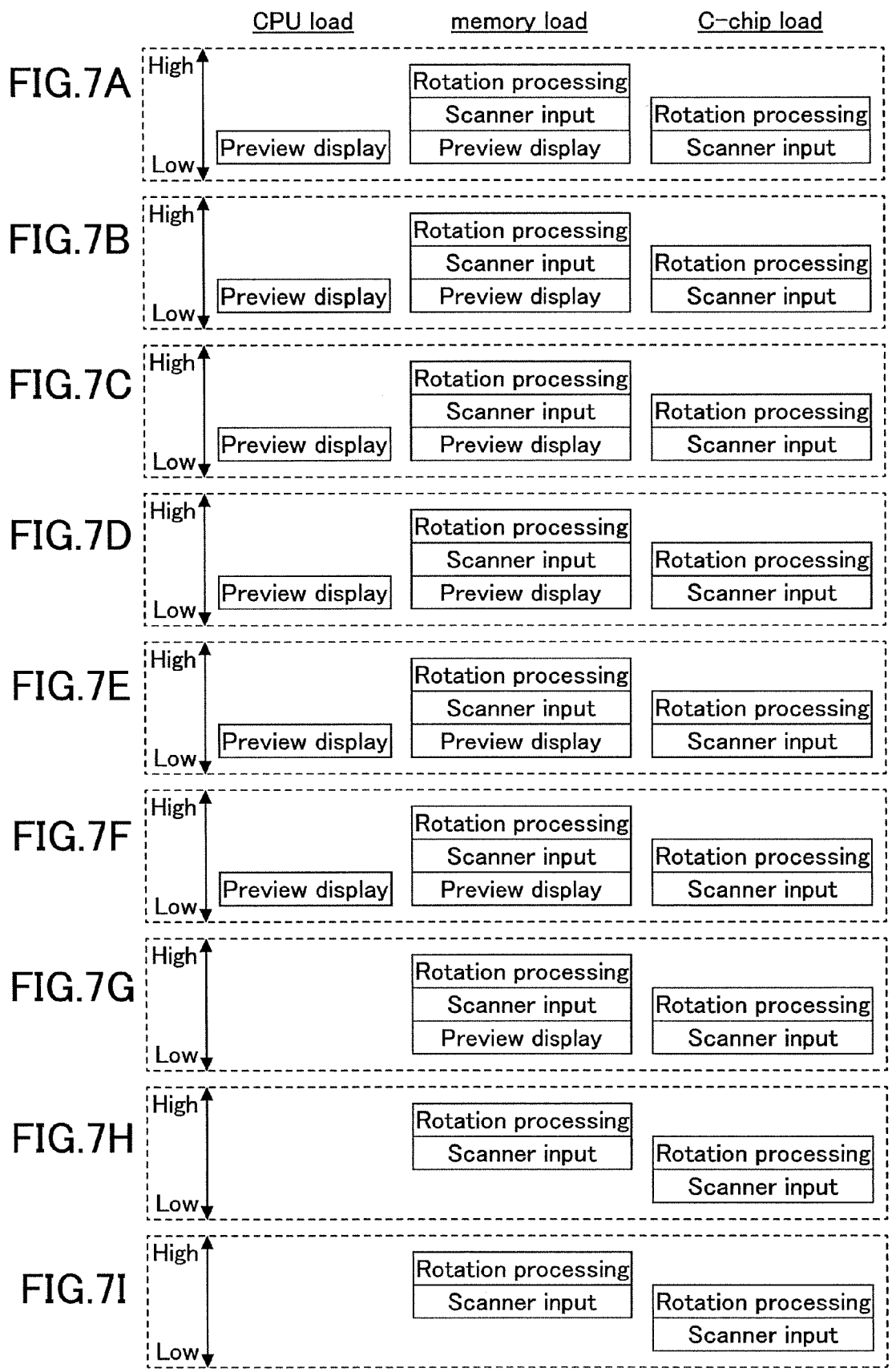

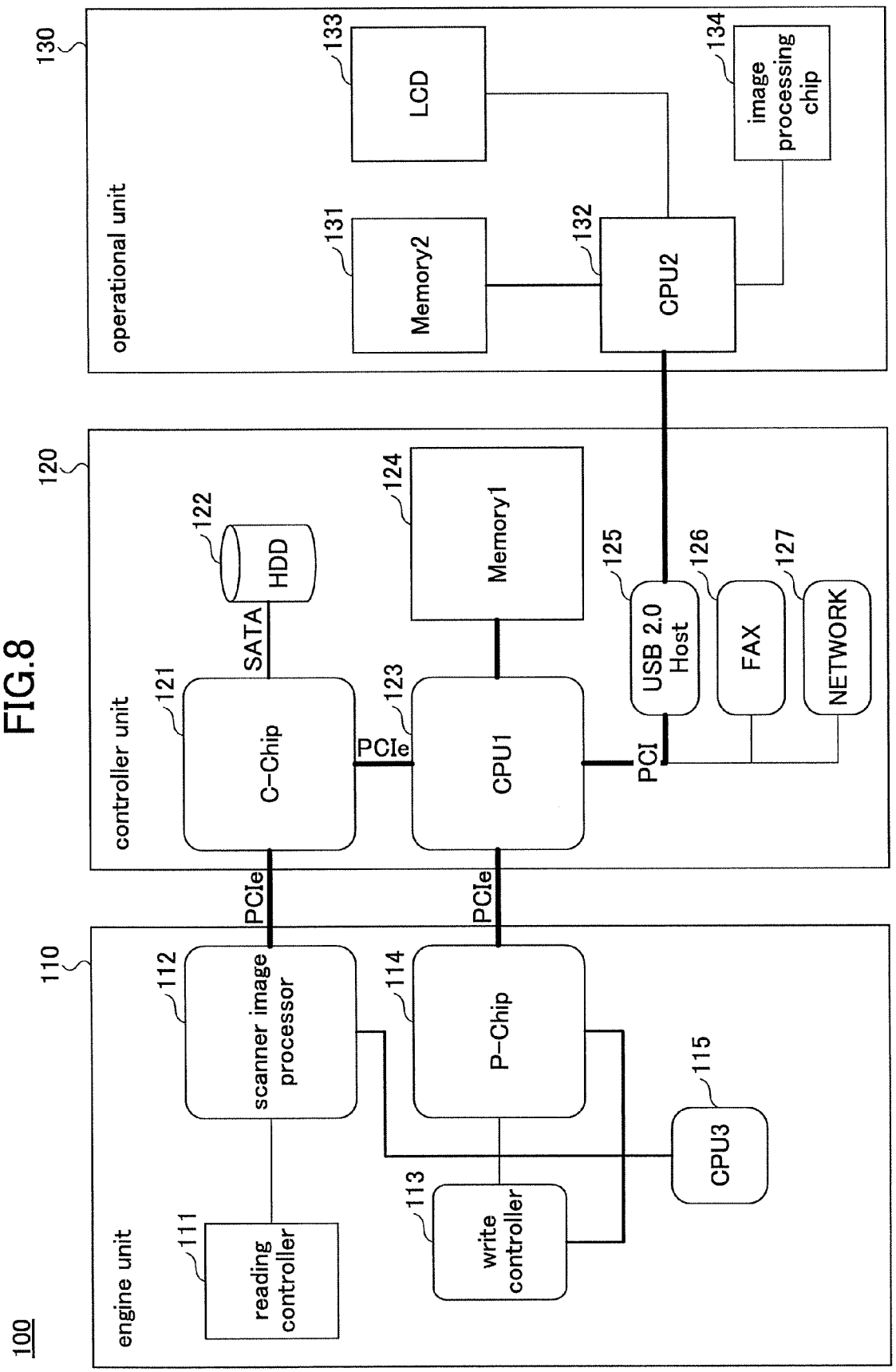

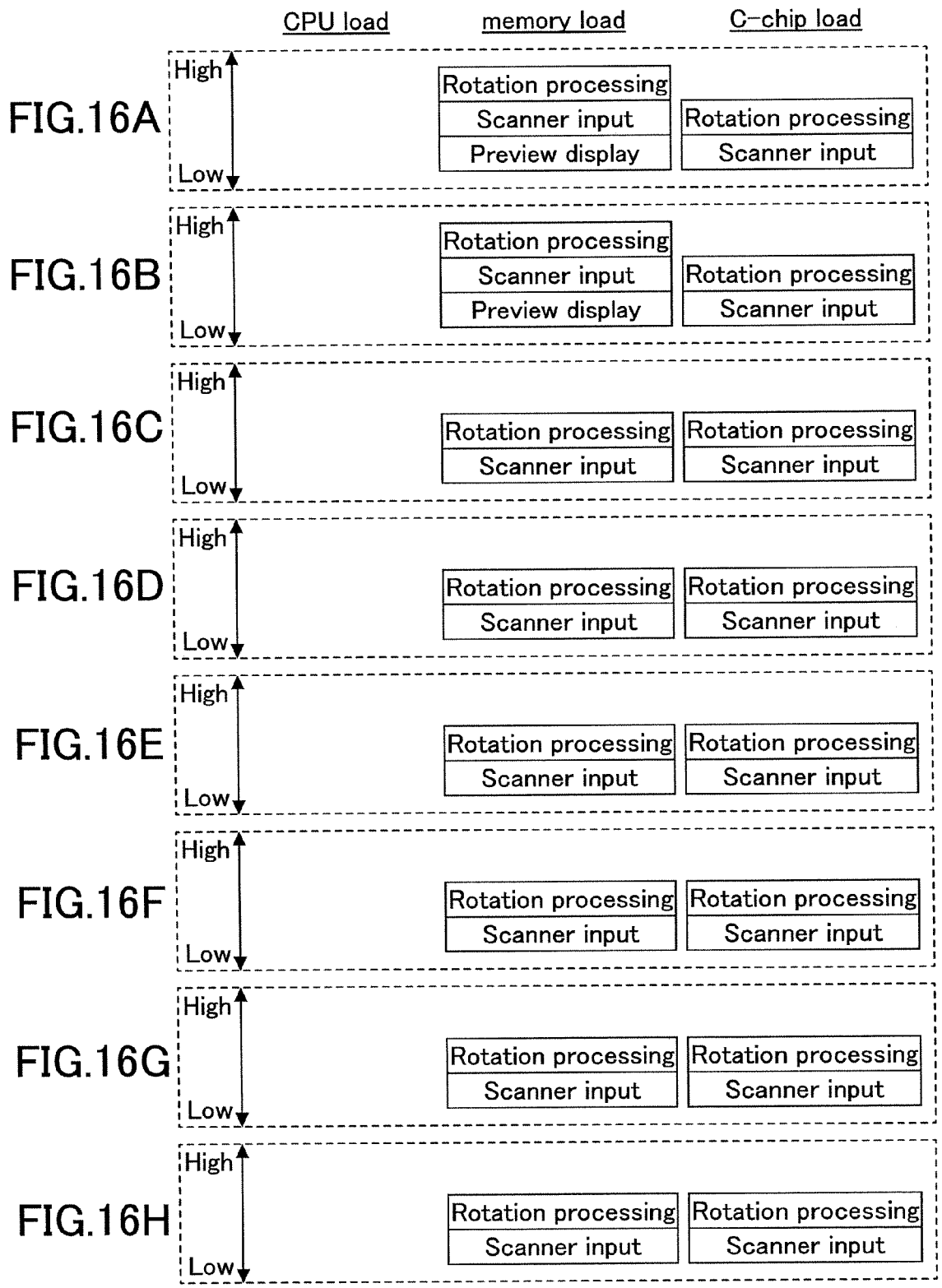

INFORMATION PROCESSING DEVICE, INFORMATION PROCESSING METHOD, AND INFORMATION PROCESSING SYSTEM

BACKGROUND OF THE INVENTION

1. Field of the Invention

The present invention relates to an information processing device, an information processing method, and an information processing system, and particularly, to an information processing device, an information processing method, and an information processing system that displays an output image of image files on a display device for confirmation by a user.

2. Description of the Related Art

In recent years and continuing, a multi-function peripheral (MFP), which is an information processing device, is developed to have more and more functions. For example, the multi-function peripheral is capable of image combination, scaling (reduction and enlargement) of image size, image rotation, color conversion, stamping, and other various kinds of processing on the image files. An operator of the multi-function peripheral can combine various kinds of processing on the image file. However, when combining various kinds of processing on the image file, it is not easy for the operator to imagine the output image produced after the various kinds of processing.

To solve this problem, in the related art, for example, Japanese Laid-Open Patent Application No. 2003-51907 discloses a multi-function peripheral, in which the output image of input image files produced after the various processing is prepared in advance, and the output image is displayed on an operational panel or the like for confirmation by the operator.

Since the multi-function peripheral has plural functions of a printer, a scanner, a facsimile machine, and others, and it is thus able to perform processing of displaying output images, scanner inputting processing, rotation processing, and other processing in parallel. For this reason, the multi-function peripheral is liable to concentrate processing on the CPU of a controller unit, which performs overall control of the multi-function peripheral.

In addition, among the processing performed by the CPU of the controller unit, the image processing is one of the processing operations having a large workload. Thus, in the multi-function peripheral, a CPU and a controller chip are provided in the controller unit, and the controller chip assumes the image processing originally assigned to the CPU of the controller unit to distribute the workload.

However, since the image processing has a large workload, when the controller chip assumes the image processing originally assigned to the CPU, the processing is concentrated on the controller chip.

Furthermore, when producing the output image after processing and outputting the output image for confirmation by the operator, one would rather produce the output image with the real image of the image files to be processed than use the output image prepared in advance.

However, the workload of the image processing of producing the output image with the real image increases noticeably; thus, the processing is much concentrated on the controller chip. Since the controller unit performs overall control of the multi-function peripheral, it is not preferable that the processing be concentrated on the CPU of the controller chip and the controller chip of the controller unit.

SUMMARY OF THE INVENTION

An embodiment of the present invention may solve one or more problems of the related art.

A preferred embodiment of the present invention may provide an information processing device, an information processing method, and an information processing system able to distribute a processing workload, and allowing easy confirmation of an output image of processed images.

According to a first aspect of the present invention, there is provided an information processing device, comprising:
an engine unit that performs image forming processing;
a controller unit that controls overall operations of the information processing device; and
an operational unit that serves as a user interface,
wherein
the controller unit includes
a first memory for storing one or more image files to be transmitted to the operational unit,
a first calculation and processing unit that controls overall operations of the information processing device, and
a first image processing unit that assumes part of image processing originally assigned to the first calculation and processing unit, wherein
an output image of the image files after processing is produced in a unit different from the controller unit, and the output image is displayed on a display device of the operational unit.

According to a second aspect of the present invention, there is provided an information processing method of an information processing device including an engine unit that performs image forming processing; a controller unit that controls overall operations of the information processing device; an operational unit that serves as a user interface, wherein the controller unit includes a first memory for storing one or more image files to be transmitted to the operational unit, a first calculation and processing unit that controls overall operations of the information processing device, and a first image processing unit that assumes part of image processing originally assigned to the first calculation and processing unit,
said method comprising:
a step of producing an output image of the image files after processing in a unit different from the controller unit; and
a step of displaying the output image on a display device of the operational unit.

According to a third aspect of the present invention, there is provided an information processing system, comprising:
an engine unit that performs image forming processing;
a controller unit that controls overall operations of the information processing system;
an operational unit that serves as a user interface,
wherein
the controller unit includes:
a first memory for storing one or more image files to be transmitted to the operational unit,
a first calculation and processing unit that controls overall operations of the information processing system, and
a first image processing unit that assumes part of image processing originally assigned to the first calculation and processing unit, wherein
an output image of the image files after processing is produced in a unit different from the controller unit, and the output image is displayed on a display device of the operational unit.

According to an embodiment of the present invention, it is possible to provide an information processing device, an information processing method, and an information processing system able to distribute a processing workload, and allow an operator to easily imagine an output image of input image files after processing.

These and other objects, features, and advantages of the present invention will become more apparent from the following detailed description of preferred embodiments given with reference to the accompanying drawings.

BRIEF DESCRIPTION OF THE DRAWINGS

FIG. 7A through FIG. 7I are diagrams illustrating changes with time of workloads on the CPU, the memory and the controller chip;

FIG. 8 is a block diagram illustrating a hardware configuration of an information processing device according to an embodiment of the present invention;

FIG. 16A through FIG. 16H are diagrams illustrating changes with time of workloads on the CPU, the memory and the controller chip in the present embodiment;

DESCRIPTION OF THE PREFERRED EMBODIMENTS

Below, preferred embodiments of the present invention are explained with reference to the accompanying drawings.

First, for easy understanding of the present invention, a general configuration of the information processing device is described first.

Figure 1:
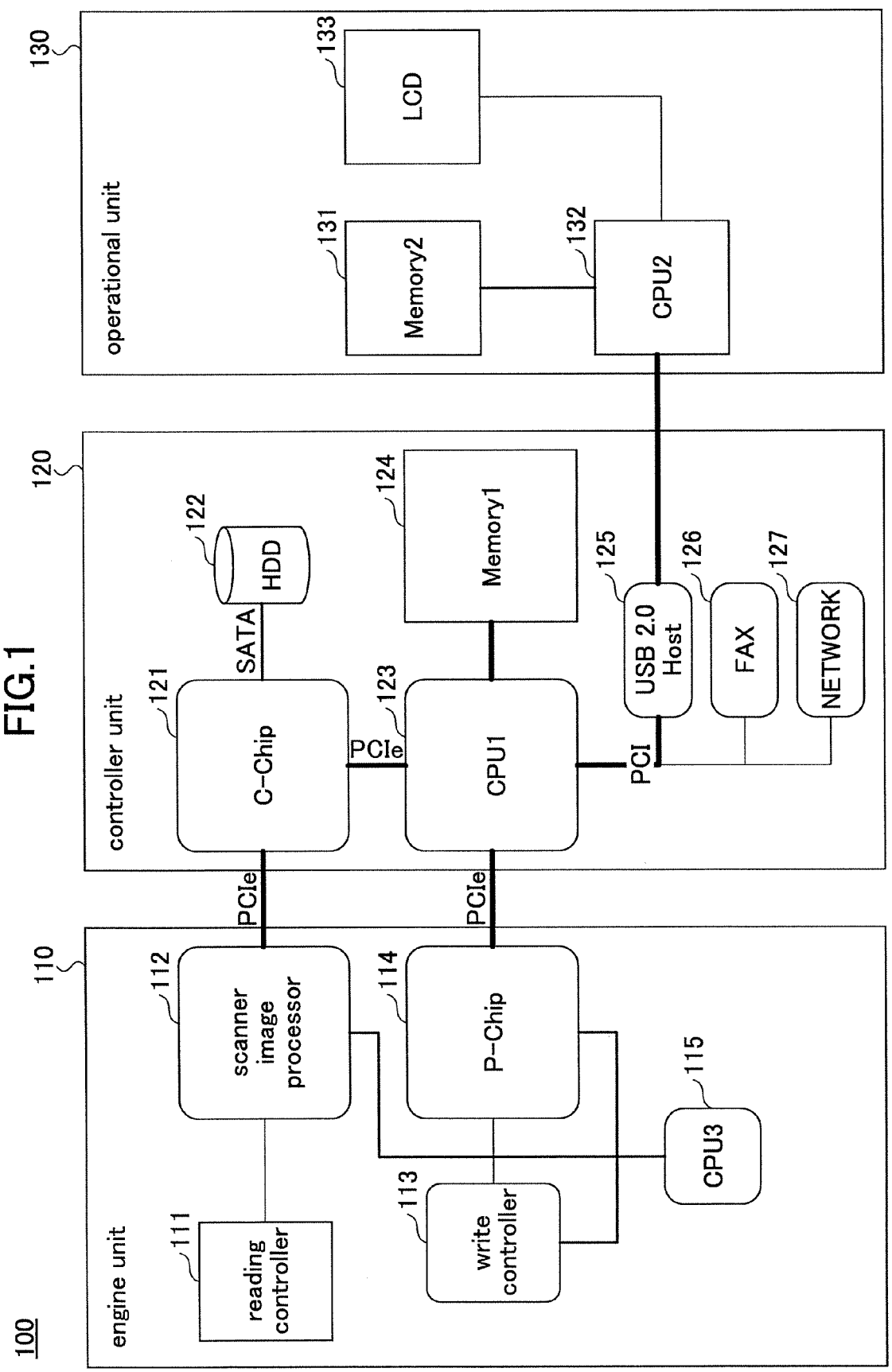
FIG. 1 is a block diagram illustrating a general hardware configuration of an information processing device.

FIG. 1 is a block diagram illustrating a general hardware configuration of an information processing device.

As shown in FIG. 1, an information processing device 100 includes an engine unit 110, a controller unit 120, and an operational unit 130.

The engine unit 110 realizes image forming functions of the information processing device 100.

The controller unit 120 performs overall control of the information processing device 100.

The operational unit 130 is a user interface for receiving data from a user through input operations of the user, and providing information for the user.

The engine unit 110 includes a reading controller 111, a scanner image processor 112, a write controller 113, a plotter chip (P-chip) 114, and a CPU 115.

The controller unit 120 includes a controller chip (C-chip) 121, a hard-disk drive (HDD) 122, a CPU 123, and a memory 124.

The operational unit 130 includes a memory 131, a CPU 132, and a liquid crystal monitor (LCD) 133.

The controller chip 121 and the CPU 123 of the controller unit 120 are connected via a PCI express bus (indicated as "PCIe" in FIG. 1). The controller chip 121 assumes the image processing originally assigned to the CPU 123 to distribute the workload.

The controller chip 121 is connected to the scanner image processor 112 of the engine unit 110 via the PCIe, and is connected to the HDD 122 via a serial ATA (SATA) bus.

The CPU 123 is connected to the plotter chip 114 of the engine unit 110 via the PCIe, and is connected to the memory 124. In addition, the CPU 123 is connected to a USB 2.0 host 125 via a PCI bus. The USB 2.0 host 125 is connected to the CPU 132 of the operational unit 130. Further, the CPU 123 is connected to a facsimile machine (indicated as "FAX" in FIG. 1) 126 and a network (indicated as "NETWORK" in FIG. 1) via the PCI.

In the information processing device 100 shown in FIG. 1, the controller chip 121 is used to perform image combination, scaling (reduction and enlargement) of image size, image rotation, color conversion, stamping, and other various kinds of processing on the image files. Further, the information processing device 100 uses the controller chip 121 to produce an output image of the original image files, and displays the output image on the liquid crystal monitor (LCD) 133 for confirmation of the user.

Below, descriptions are made of various processing by using the controller chip 121.

A first processing performed by the controller chip 121 is to display the output image of image files read from a scanner on the liquid crystal monitor 133. Namely, the controller chip 121 displays a preview image for previewing the output image after various processing is performed.

The image files read from the scanner are stored in the memory 124 of the controller unit 120 via the reading controller 111 and the scanner image processor 112 of the engine unit 110, the controller chip 121, and the CPU 123 of the controller unit 120. The CPU 123 uses the controller chip 121 to produce the output image of the image files stored in the memory 124, and to display the output image on the liquid crystal monitor 133 for confirmation of the user.

A second processing performed by the controller chip 121 is to display the output image of image files read from the hard disk drive 122 on the liquid crystal monitor 133.

The image files read from the hard disk drive 122 are stored in the memory 124 of the controller unit 120 via the controller chip 121 and the CPU 123 of the controller unit 120. The CPU 123 uses the controller chip 121 to produce the output image of the image files stored in the memory 124, and to display the output image on the liquid crystal monitor 133 for confirmation of the user.

A third processing performed by the controller chip 121 is to display the output image of image files received by the facsimile machine (FAX) 126 on the liquid crystal monitor 133.

The image files received by the facsimile machine 126 are stored in the memory 124 of the controller unit 120 via the CPU 123 of the controller unit 120. The CPU 123 uses the controller chip 121 to produce the output image of the image files stored in the memory 124, and to display the output image on the liquid crystal monitor 133 for confirmation of the user.

A fourth processing performed by the controller chip 121 is to display the output image of image files received by the network 127 on the liquid crystal monitor 133.

The image files read from the network 127 are stored in the memory 124 of the controller unit 120 via the CPU 123 of the controller unit 120. The CPU 123 uses the controller chip 121 to produce the output image of the image files stored in the memory 124, and to display the output image on the liquid crystal monitor 133 for confirmation of the user.

A fifth processing performed by the controller chip 121 is to store the image files read from the scanner in the memory 124.

The image files read from the scanner are stored in the memory 124 of the controller unit 120 via the reading controller 111 and the scanner image processor 112 of the engine unit 110, the controller chip 121, and the CPU 123 of the controller unit 120.

A sixth processing performed by the controller chip 121 is to output the image files stored in the memory 124 to a plotter. Here, assume the image files stored in the memory 124 are of a RGB format. The CPU 123 uses the controller chip 121 to perform color conversion on the image files stored in the memory 124 from the RGB format to a CMYK format. The thus obtained image files of the CMYK format are output to the plotter via the CPU 123 of the controller unit 120, the plotter chip 114 and the write controller 113 of the reading controller 111, and are output by the plotter.

A seventh processing performed by the controller chip 121 is to transmit the image files stored in the memory 124 by the facsimile machine 126. Here, assume the image files stored in the memory 124 are of the RGB format. The CPU 123 uses the controller chip 121 to perform color conversion on the image files stored in the memory 124 from the RGB format to a format compatible with the facsimile machine 126, such as, a B/W format. The thus obtained image files of the FAX format are transmitted by the facsimile machine 126 via the CPU 123 of the controller unit 120.

An eighth processing performed by the controller chip 121 is to transmit the image files stored in the memory 124 to the network 127. The CPU 123 uses the controller chip 121 to perform appropriate image processing on the image files stored in the memory 124, and the thus obtained image files are transmitted to the network 127 via the CPU 123 of the controller unit 120.

The above first to eighth processing is just exemplified for illustration; it is apparent that the controller chip 121 can perform other kinds of processing.

Figure 2:
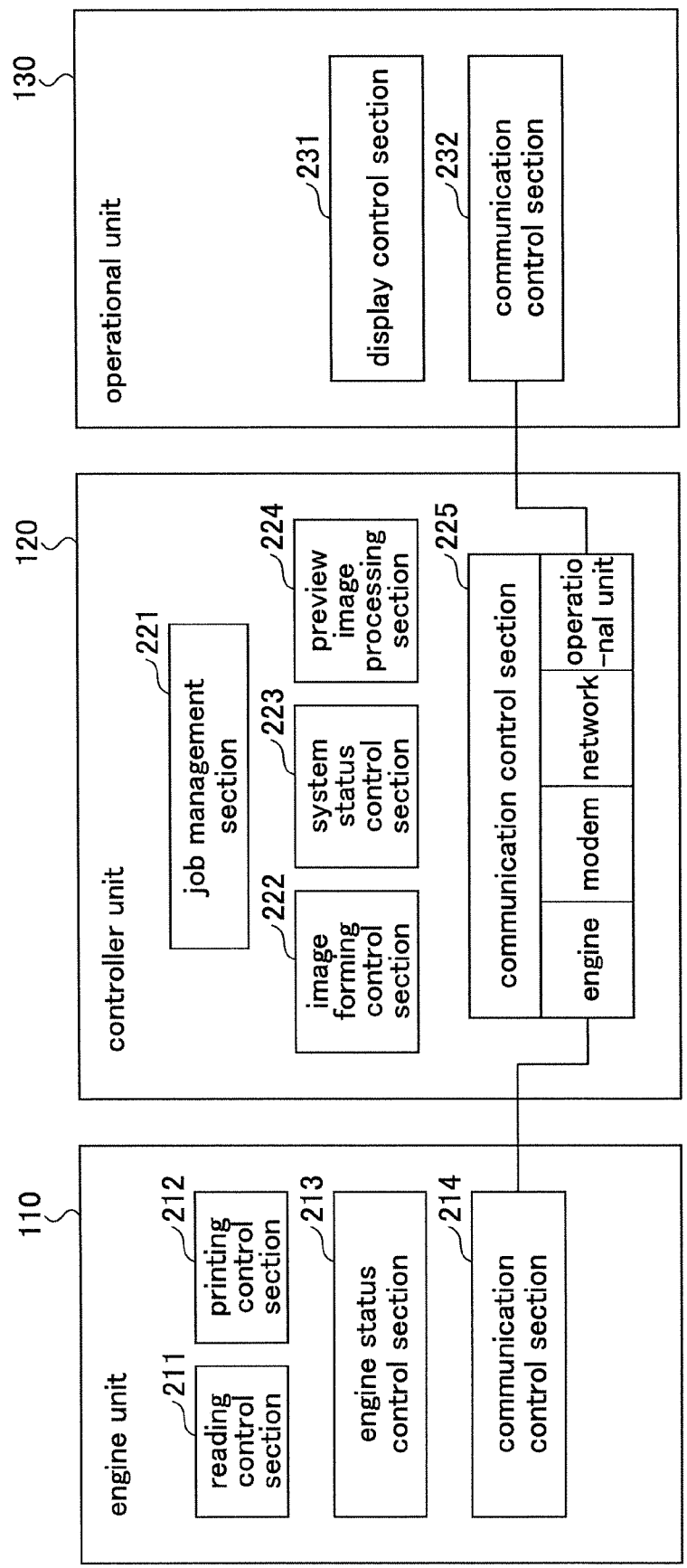
FIG. 2 is a block diagram illustrating a general software configuration of an information processing device.

In order to perform the above mentioned processing, the information processing device 100 shown in FIG. 1 may have a software configuration as shown in FIG. 2.

FIG. 2 is a block diagram illustrating a general software configuration of an information processing device.

As shown in FIG. 2, the information processing device 100 includes the engine unit 110, the controller unit 120, and the operational unit 130.

The engine unit 110 of the information processing device 100 includes a reading control section 211, a printing control section 212, an engine status control section 213, and a communication control section 214.

The controller unit 120 includes a job management section 221, an image forming control section 222, a system status control section 223, an output image processing section 224, and a communication control section 225.

The operational unit 130 includes a display control section 231, and a communication control section 232.

The software configuration as shown in FIG. 2 is realized by using the hardware configuration as shown in FIG. 1. As shown in FIG. 2, the controller unit 120 includes the output image processing section 224; hence, when displaying the output image on the liquid crystal monitor 133, the output image processing section 224 of the controller unit 120 produces the output image of the processed image files, and the output image is sent to the operational unit 130 to display the output image on the liquid crystal monitor 133 of the operational unit 130.

The various processing performed by the controller chip 121 is usually performed in parallel. In this case, in the information processing device 100 as shown in FIG. 1 and FIG. 2, the processing workload is concentrated on the controller chip 121.

Below, descriptions are made of workload concentration on the controller chip 121 when an output image display procedure, a scanner input procedure, and a rotation procedure are executed in parallel.

FIG. 3A through FIG. 3I are diagrams illustrating the output image display procedure.

FIG. 3A through FIG. 3I are arranged in temporal sequence. Namely, FIG. 3A corresponds to operations at the earliest time, and FIG. 3I corresponds to operations at the latest time. In addition, in FIG. 3A through FIG. 3I, in the image combination processing, two images are combined into one image (simply indicated as "2 in 1"). Namely, when displaying an output image resulting from a "2 in 1" combination, an output image after two images are combined into one image is displayed.

Figure 4A:
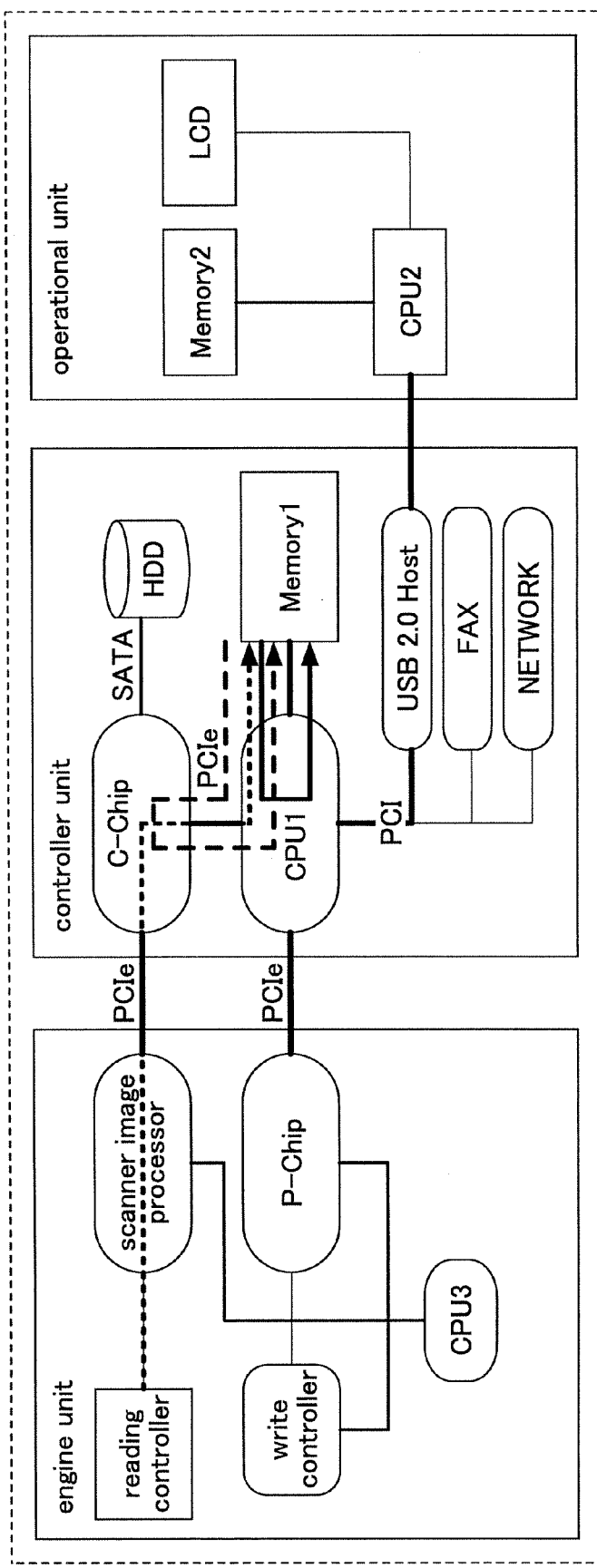
FIG. 4A through FIG. 4C are block diagrams illustrating an example of plural processing paths during parallel processing.
Figure 4B:
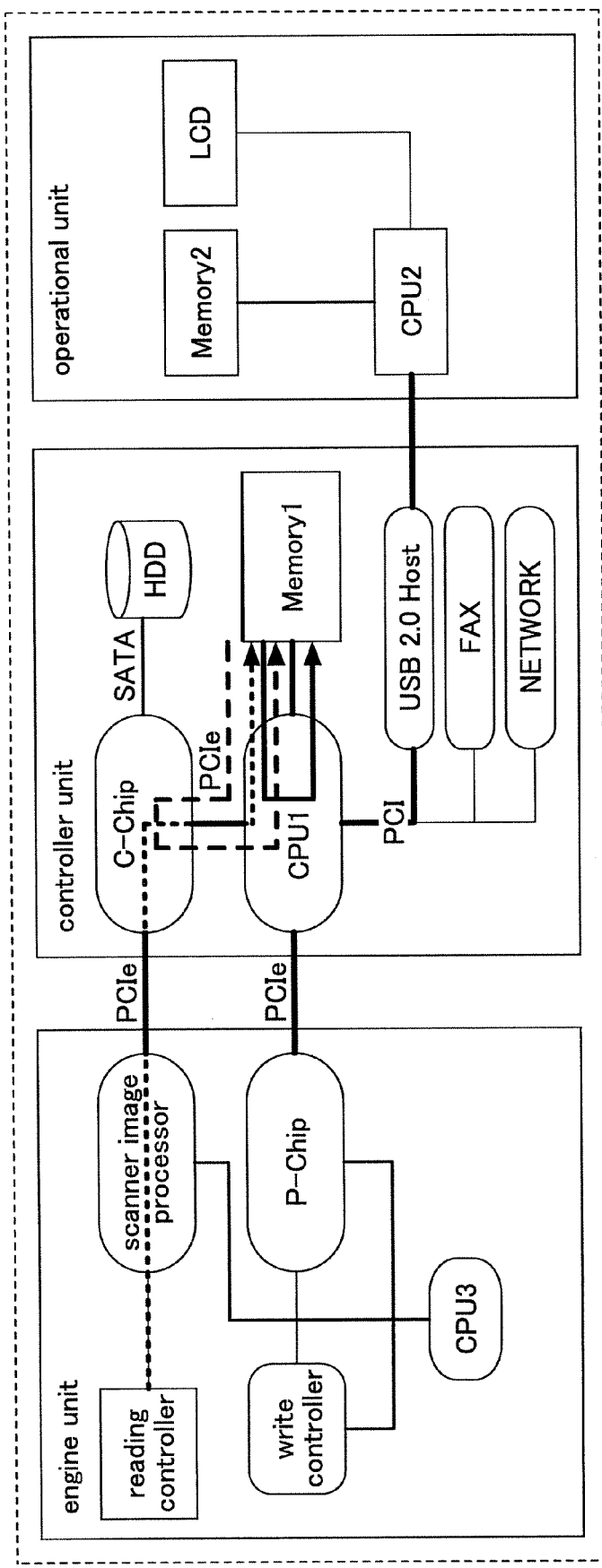
Figure 4C:
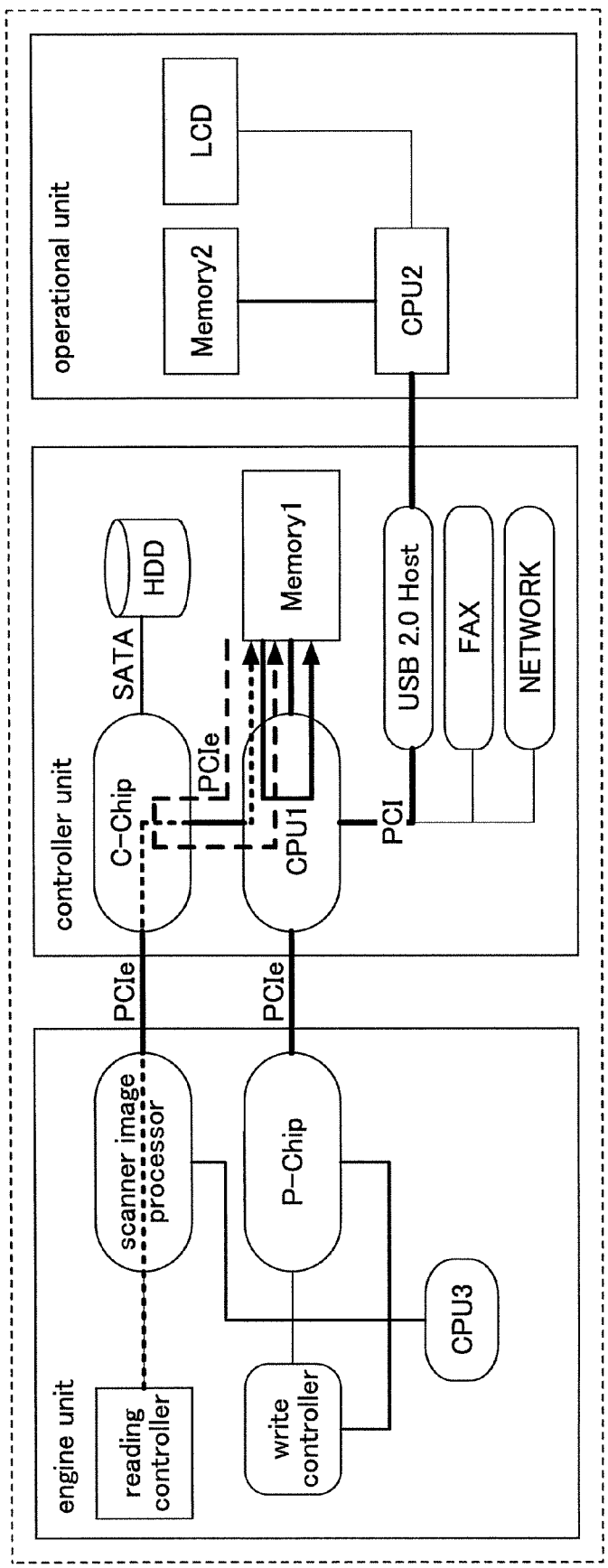

FIG. 4A through FIG. 4C are block diagrams illustrating an example of plural processing paths during parallel processing.

Figure 5A:
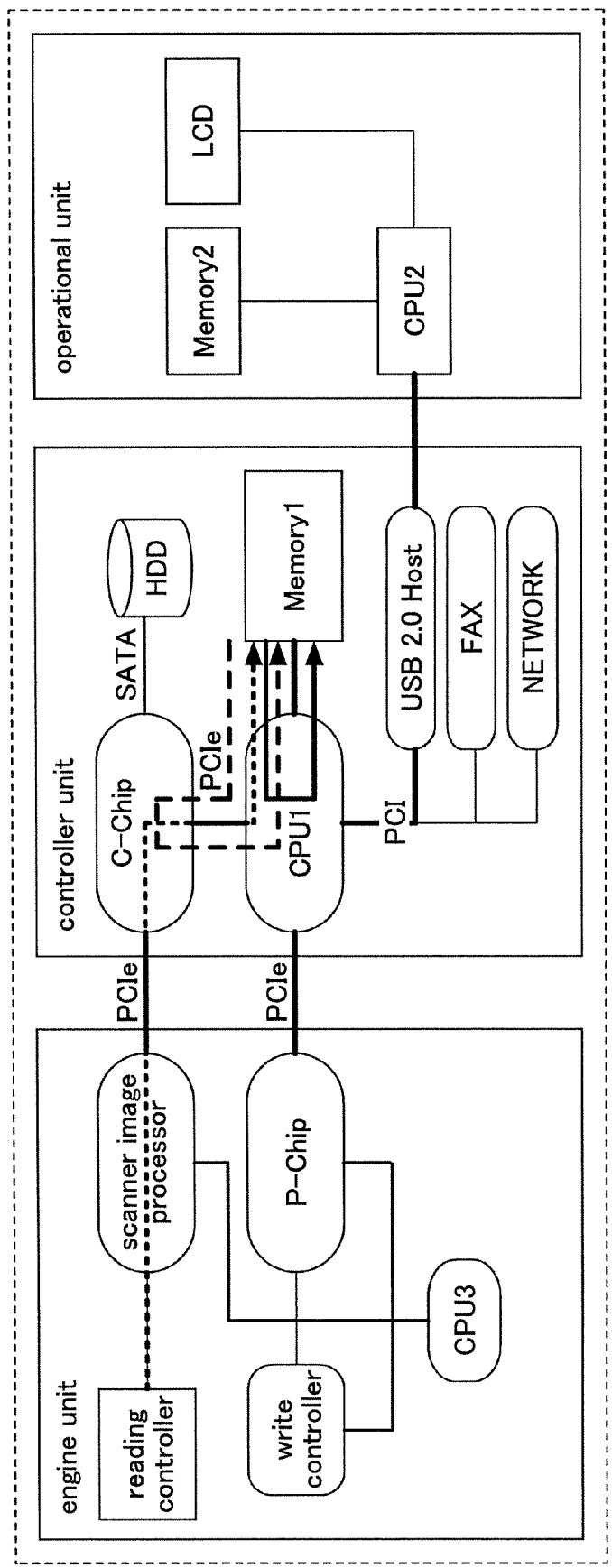
FIG. 5A through FIG. 5C, continuing from FIG. 4C, are block diagrams illustrating the example of the processing paths during the parallel processing.
Figure 5B:
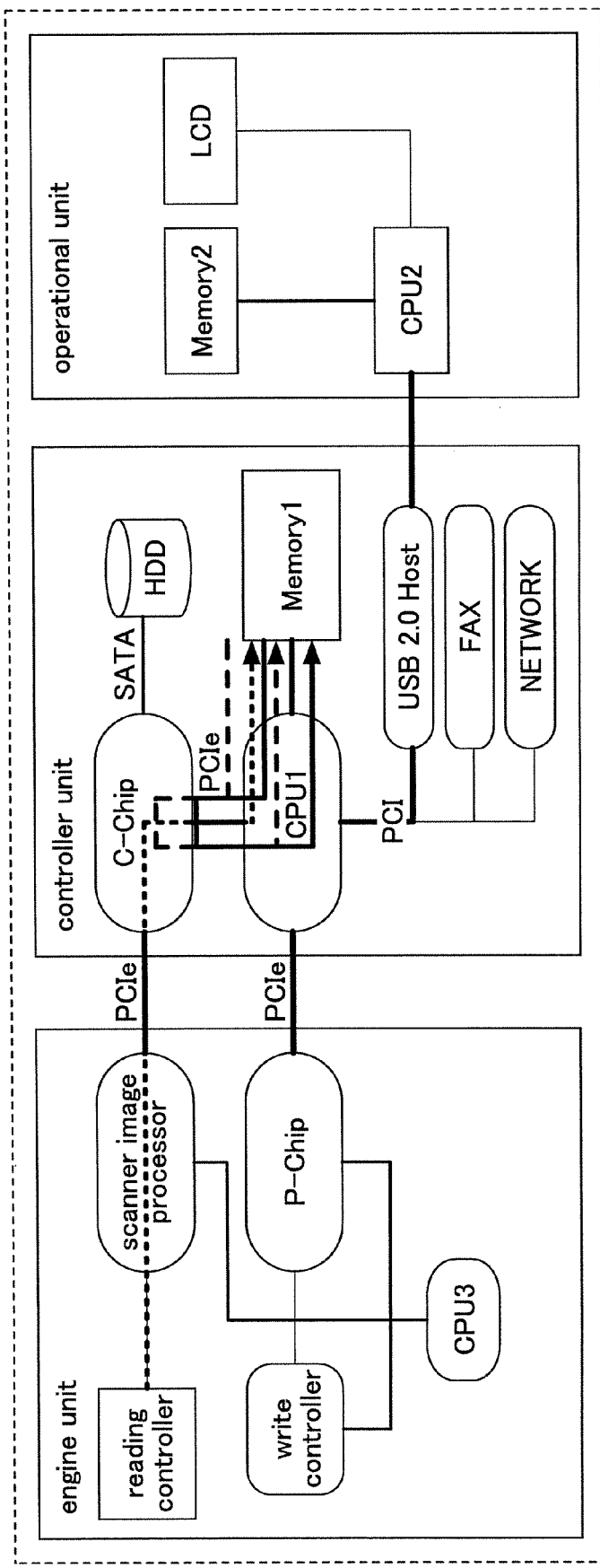
Figure 5C:
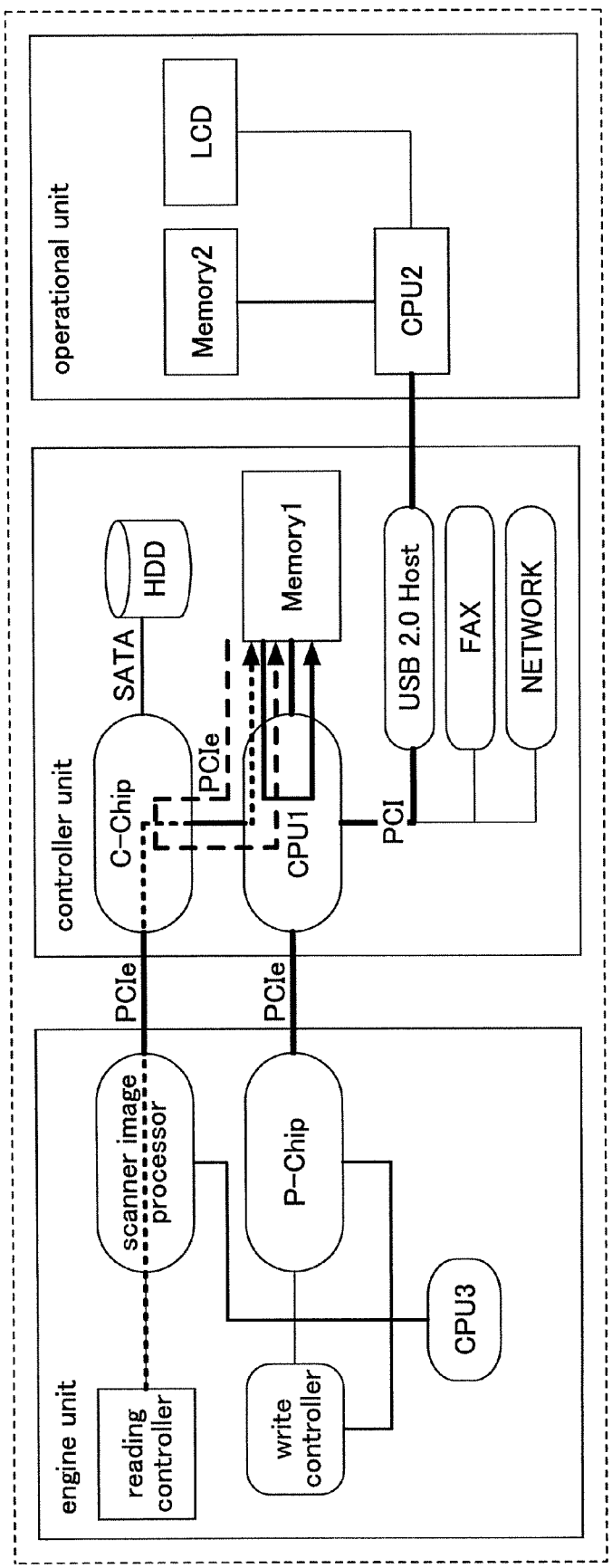

FIG. 5A through FIG. 5C, continuing from FIG. 4C, are block diagrams illustrating the example of the processing paths during the parallel processing.

Figure 6A:
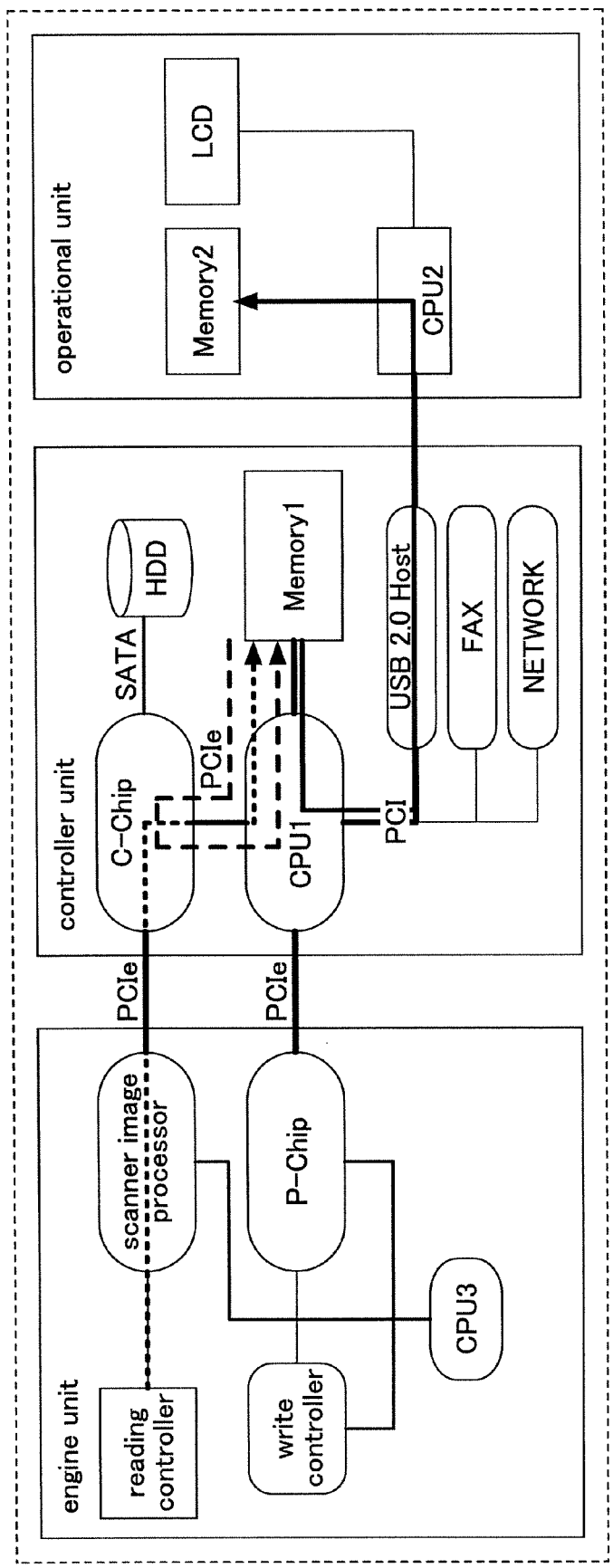
FIG. 6A through FIG. 6C, continuing from FIG. 5C, are block diagrams illustrating the example of the processing paths during the parallel processing.
Figure 6B:
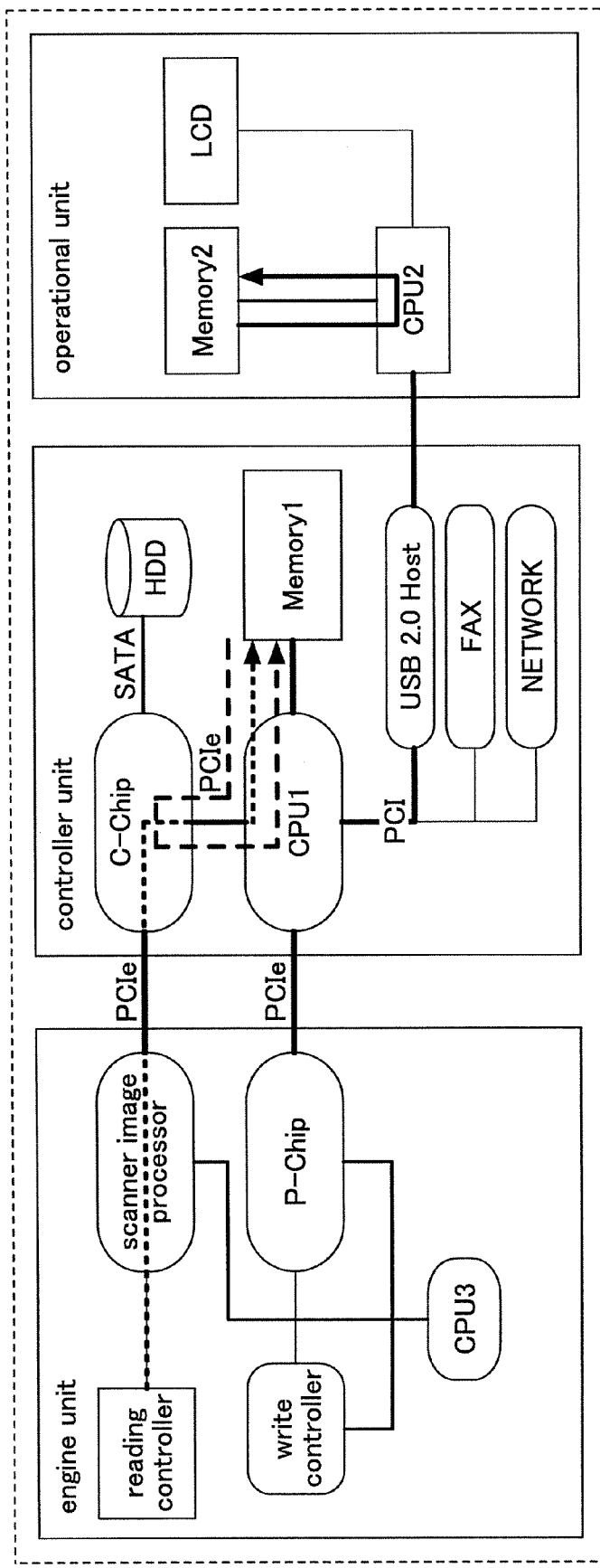
Figure 6C:
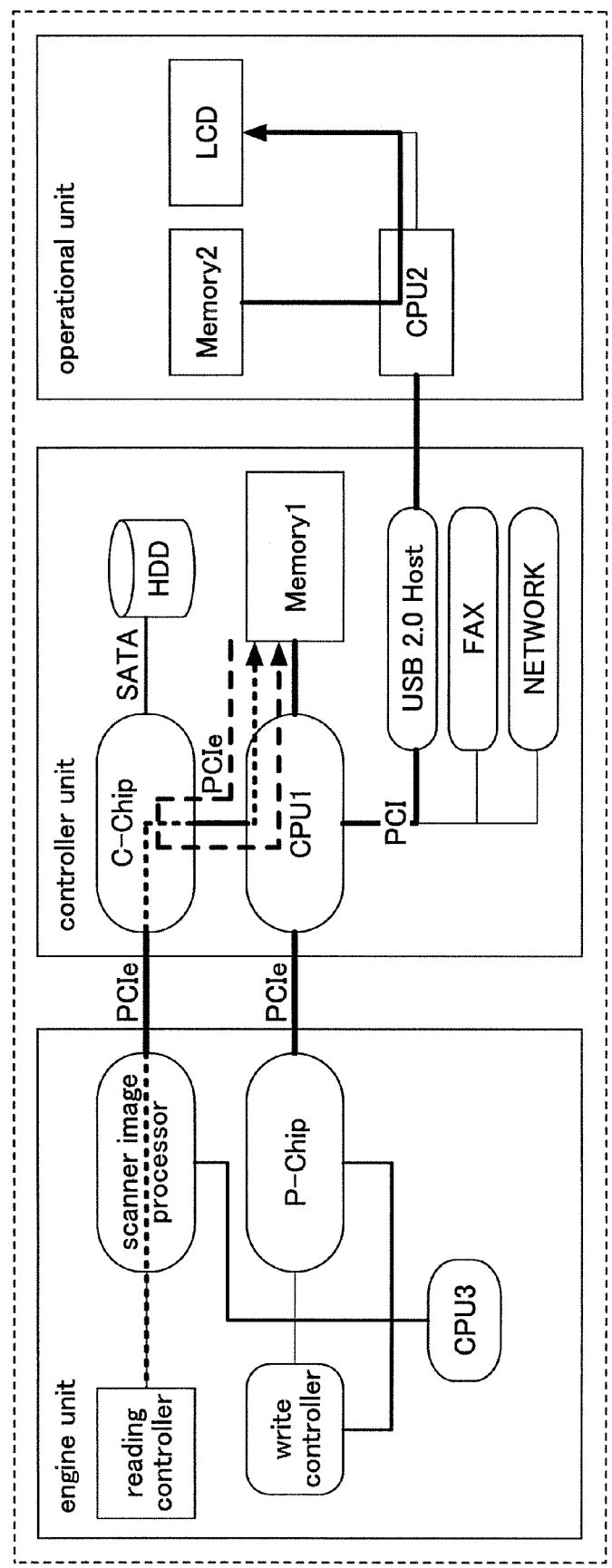

FIG. 6A through FIG. 6C, continuing from FIG. 5C, are block diagrams illustrating the example of the processing paths during the parallel processing.

In FIG. 4A through FIG. 4C, FIG. 5A through FIG. 5C, and FIG. 6A through FIG. 6C, the processing path of the scanner input procedure is indicated by dotted lines, the processing path of the rotation procedure is indicated by dashed lines, and the processing path of the output image display procedure is indicated by solid lines.

The processing path of the scanner input procedure indicated by dotted lines successively passes through the reading controller 111 and the scanner image processor 112 of the engine unit 110, and the controller chip 121, the CPU 123, and the memory 124 of the controller unit 120 in the time period from FIG. 3A to FIG. 3I.

The processing path of the rotation procedure indicated by dashed lines successively passes through the controller chip 121, the CPU 123, and the memory 124 of the controller unit 120 in the time period from FIG. 3A to FIG. 3I.

The processing path of the output image display procedure indicated by solid lines changes depending on the progress of the output image display procedure in the time period from FIG. 3A to FIG. 3I.

Next, the output image display procedure is explained with reference to FIG. 3A through FIG. 3I, FIG. 4A through FIG. 4C, FIG. 5A through FIG. 5C, and FIG. 6A through FIG. 6C.

Figure 3A:
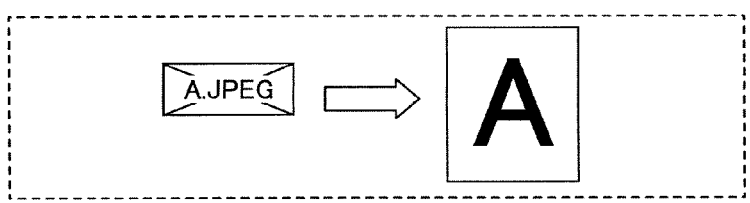
FIG. 3A through FIG. 3I are diagrams illustrating the output image display procedure.
Figure 3B:
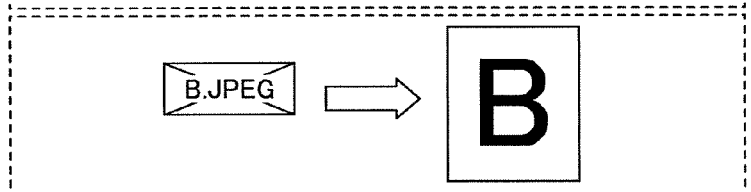

FIG. 3A and FIG. 3B illustrate an operation of decomposing JPEG compressed image files. The processing paths of the output image display procedure at this stage, as illustrated by solid lines in FIG. 4A and FIG. 4B, pass through the CPU 123, and the memory 124 of the controller unit 120.

Figure 3C:
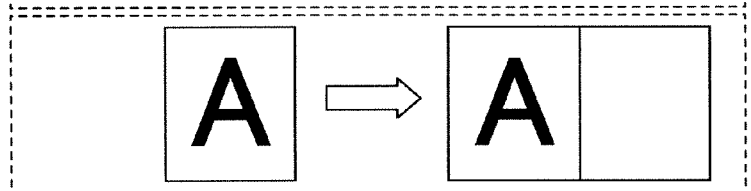
Figure 3D:
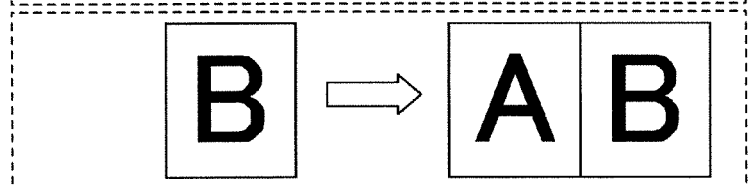

FIG. 3C and FIG. 3D illustrate an operation of combining two decomposed image files and producing the output image. The processing paths of the output image display procedure at this stage, as illustrated by solid lines in FIG. 4C and FIG. 5A, pass through the CPU 123, and the memory 124 of the controller unit 120.

Figure 3E:
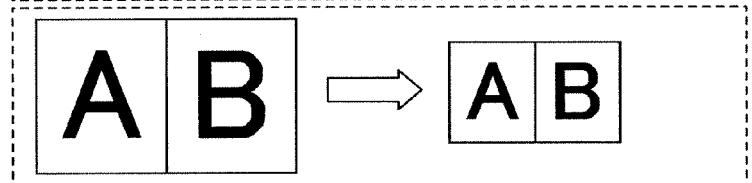

FIG. 3E illustrates an operation of reducing the size of the combined image file. The processing path of the output image display procedure at this stage, as illustrated by solid lines in FIG. 5B, passes through the controller chip 121, the CPU 123, and the memory 124 of the controller unit 120.

Figure 3F:
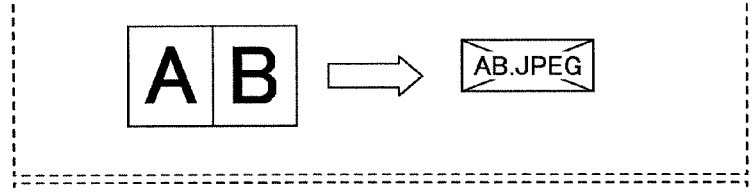

FIG. 3F illustrates an operation of compressing the reduced image file. The processing path of the output image display procedure at this stage, as illustrated by solid lines in FIG. 5C, passes through the controller chip 121, the CPU 123, and the memory 124 of the controller unit 120.

Figure 3G:
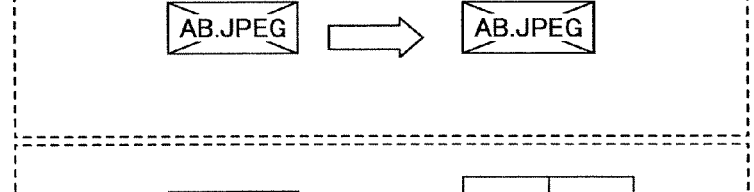

FIG. 3G illustrates an operation of sending the compressed image file to the memory 131 of the operational unit 130. The processing path of the output image display procedure at this stage, as illustrated by solid lines in FIG. 6A, passes through the memory 131 and the CPU 132 of the operational unit 130.

Figure 3H:
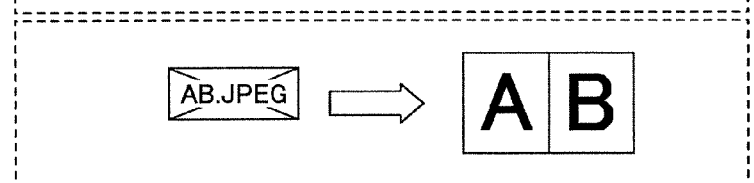

FIG. 3H illustrates an operation of decompressing the compressed JPEG image file. The processing path of the output image display procedure at this stage, as illustrated by solid lines in FIG. 6B, passes through the memory 131 and the CPU 132 of the operational unit 130.

Figure 3I:
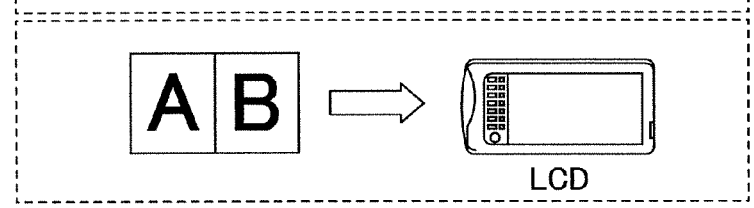

FIG. 3I illustrates an operation of displaying the decompressed image file on the liquid crystal monitor (LCD) 133 of the operational unit 130. The processing path of the output image display procedure at this stage, as illustrated by solid lines in FIG. 6C, passes through the memory 131, the CPU 132, and the liquid crystal monitor (LCD) 133 of the operational unit 130.

FIG. 7A through FIG. 7I are diagrams illustrating changes with time of workloads on the CPU, the memory and the controller chip.

Specifically, FIG. 7A through FIG. 7I show the magnitude of the processing workload on the controller chip 121, the CPU 123, and the memory 124 at corresponding times.

Similar to FIG. 3A through FIG. 3I, FIG. 7A through FIG. 7I are also arranged in temporal sequence, namely, FIG. 7A corresponds to operations at the earliest time, FIG. 7I corresponds to operations at the latest time, and FIG. 7A through FIG. 7I are associated with image combination processing, in which two images are combined into one image (namely, "2 in 1" combination).

As shown in FIG. 7A through FIG. 7I, when the output image display procedure, the scanner input procedure, and the rotation procedure are executed in parallel, the processing workloads are concentrated on the controller chip 121 and the memory 124.

As described above with reference to FIG. 3A through FIG. 3I, FIG. 4A through FIG. 4C, FIG. 5A through FIG. 5C, FIG. 6A through FIG. 6C, and FIG. 7A through FIG. 7I, the information processing device 100 shown in FIG. 1 is a controller-centralized device, in which the output image is produced in the controller unit 120. The output image may be produced in the operational unit 130 (this is the so-called "operational unit-centralized device"). Further, production of the output image may also be performed in any components of the information processing device 100 other than the controller unit 120. In this case, the operations of the controller unit 120 of the controller-centralized information processing device 100 should be shifted to components of the information processing device 100 other than the controller unit 120.

In order to produce the output image in components of the information processing device 100 other than the controller unit 120, for example, it can be attempted to provide an image processing chip or a software package equivalent to the image processing unit of the controller chip 121 in the component of the information processing device 100 which is different from the controller unit 120. Alternatively, it can be attempted to provide plural image processing units of the controller chip 121 of the controller unit 120. However, from the point of view of data buses and the number of sequence steps, it is efficient to provide an image processing chip or a software package equivalent to the image processing unit of the controller chip 121 in components different from the controller unit 120 compared to providing plural image processing units of the controller chip 121 of the controller unit 120.

Below, descriptions are made of an information processing device in which an image processing chip or a software package equivalent to the image processing unit of the controller chip 121 is provided in components different from the controller unit 120.

FIG. 8 is a block diagram illustrating a hardware configuration of an information processing device according to an embodiment of the present invention.

An information processing device 100 shown in FIG. 8 is basically the same as the information processing device 100 shown in FIG. 1 except that an image processing chip 134, which is the same as the image processing chip in the controller chip (C-chip) 121, is additionally provided in the operational unit 130. Below, the same reference numbers are assigned to the same components as those described previously, and overlapping descriptions are omitted.

In the information processing device 100 shown in FIG. 8, the operational unit 130 includes the memory 131, the CPU 132, the liquid crystal monitor (LCD) 133, and the image processing chip 134.

The CPU 132 is connected to the USB 2.0 host 125 of the controller unit 120, and is connected to the memory 131, the liquid crystal monitor (LCD) 133, and the image processing chip 134 of the operational unit 130.

In the information processing device 100 shown in FIG. 8, the image processing chip 134 is used to perform image combination, scaling (reduction and enlargement) of image size, image rotation, color conversion, stamping, and other various kinds of processing on the image files, the same as the image processing unit of the controller chip 121. Further, the information processing device 100 uses the image processing chip 134 to produce the output image of the original image files, and displays the output image on the liquid crystal monitor 133 for confirmation of the user.

Below, descriptions are made of various processing by using the image processing chip 134.

A first processing performed by the image processing chip 134 is to display the output image of image files read from the scanner on the liquid crystal monitor 133.

The image files read from the scanner are stored in the memory 124 of the controller unit 120 via the reading controller 111 and the scanner image processor 112 of the engine unit 110, the controller chip 121, and the CPU 123 of the controller unit 120; the image files stored in the memory 124 are transmitted and stored in the memory 131 through the CPU 123 and the USB 2.0 host 125 of the controller unit 120, and the CPU 132 of the operational unit 130.

The CPU 132 uses the image processing chip 134 to produce the output image of the image files stored in the memory 131, and to display the output image on the liquid crystal monitor 133 for confirmation of the user.

A second processing performed by the image processing chip 134 is to display the output image of image files read from the hard disk drive 122 on the liquid crystal monitor 133.

The image files read from the hard disk drive 122 are stored in the memory 124 of the controller unit 120 via the controller chip 121 and the CPU 123 of the controller unit 120; the image files stored in the memory 124 are transmitted and stored in the memory 131 through the CPU 123 and the USB 2.0 host 125 of the controller unit 120, and the CPU 132 of the operational unit 130.

The CPU 132 uses the image processing chip 134 to produce the output image of the image files stored in the memory 131, and to display the output image on the liquid crystal monitor 133 for confirmation of the user.

A third processing performed by the image processing chip 134 is to display the output image of image files received by the facsimile machine (FAX) 126 on the liquid crystal monitor 133.

The image files received by the facsimile machine 126 are stored in the memory 124 of the controller unit 120 via the CPU 123 of the controller unit 120; the image files stored in the memory 124 are transmitted and stored in the memory 131 through the CPU 123 and the USB 2.0 host 125 of the controller unit 120, and the CPU 132 of the operational unit 130.

The CPU 132 uses the image processing chip 134 to produce the output image of the image files stored in the memory 131, and to display the output image on the liquid crystal monitor 133 for confirmation of the user.

A fourth processing performed by the image processing chip 134 is to display the output image of image files received by the network 127 on the liquid crystal monitor 133.

The image files received by the network 127 are stored in the memory 124 of the controller unit 120 via the CPU 123 of the controller unit 120; the image files stored in the memory 124 are transmitted and stored in the memory 131 through the CPU 123 and the USB 2.0 host 125 of the controller unit 120, and the CPU 132 of the operational unit 130.

The CPU 132 uses the image processing chip 134 to produce the output image of the image files stored in the memory 131, and to display the output image on the liquid crystal monitor 133 for confirmation of the user.

As described above, in the information processing device 100 shown in FIG. 8, among the afore-mentioned first to eighth processing operations performed by using the controller chip 121, the first through the fourth processing operations are performed in the image processing chip 134 of the operational unit 130.

Figure 9:
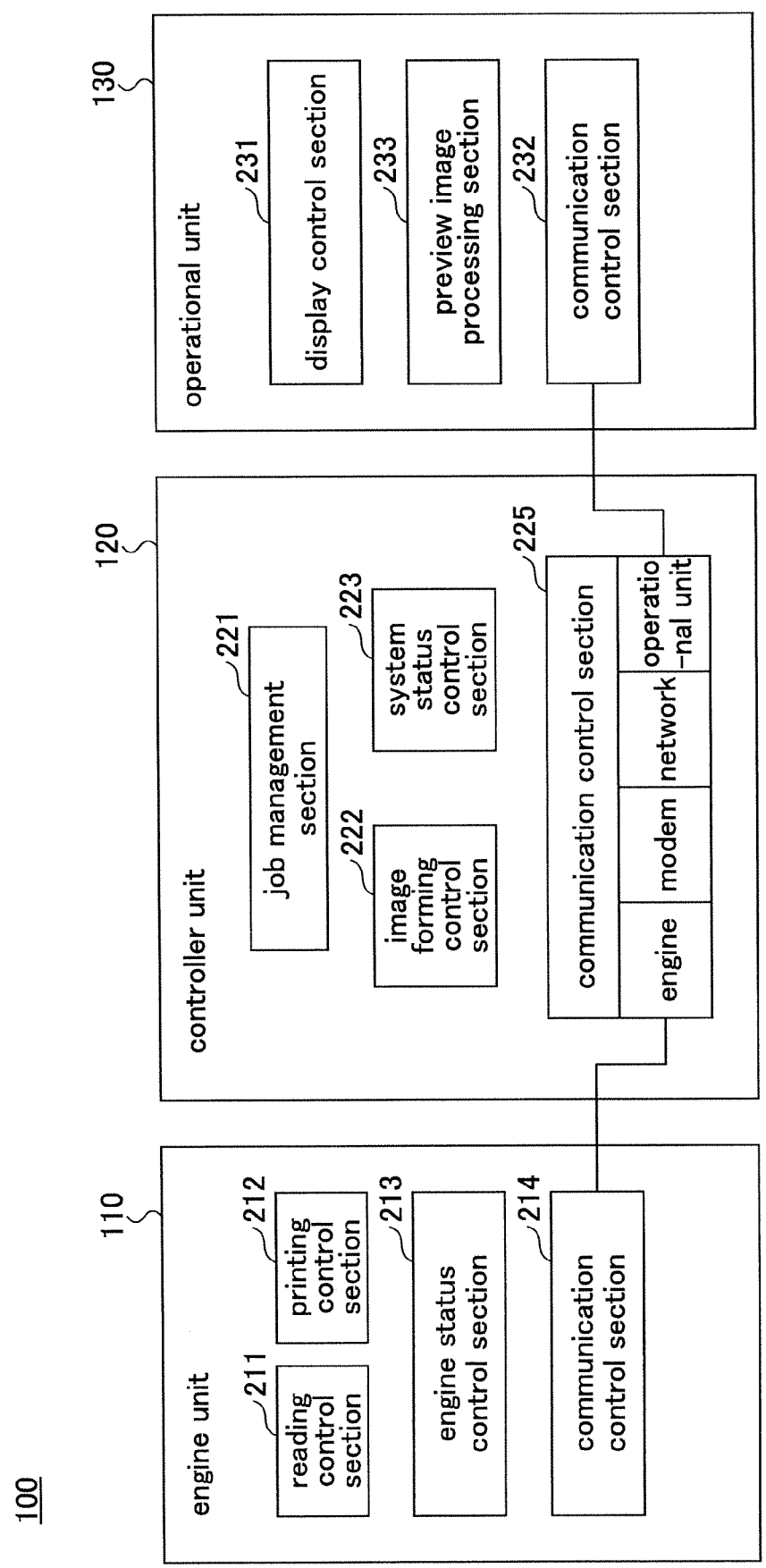
FIG. 9 is a block diagram illustrating an example of a software configuration the information processing device according to the present embodiment of the present invention.

In order to perform the above mentioned processing, the information processing device 100 shown in FIG. 8 may have a software configuration as shown in FIG. 9.

FIG. 9 is a block diagram illustrating an example of a software configuration the information processing device according to the present embodiment of the present invention.

The information processing device 100 shown in FIG. 9 is basically the same as the information processing device 100 shown in FIG. 2 except that the output image processing section 224 in the controller unit 120 of the information processing device 100 in FIG. 2 is omitted and an output image processing section 233 is provided in the operational unit 130 of the information processing device 100 shown in FIG. 8. Below, the same reference numbers are assigned to the same components as those described previously, and overlapping descriptions are omitted.

As shown in FIG. 9, the information processing device 100 includes the engine unit 110, the controller unit 120, and the operational unit 130.

The engine unit 110 of the information processing device 100 includes a reading control section 211, a printing control section 212, an engine status control section 213, and a communication control section 214.

The controller unit 120 includes a job management section 221, an image forming control section 222, a system status control section 223, and a communication control section 225.

The operational unit 130 includes a display control section 231, a communication control section 232, and an output image processing section 233.

The software configuration as shown in FIG. 9 is realized by using the hardware configuration as shown in FIG. 8. As shown in FIG. 9, the operational unit 130 includes the output image processing section 233; hence, when displaying the output image on the liquid crystal monitor 133, the image files are transmitted from the controller unit 120 to the operational unit 130, the output image processing section 233 of the operational unit 130 produces the output image of the processed image files, and the output image is displayed on the liquid crystal monitor 133 of the operational unit 130.

Therefore, in the information processing device 100 shown in FIG. 8 and FIG. 9, among various procedures executed by the controller chip 121 in the information processing device 100 shown in FIG. 1 and FIG. 2, the output image display procedure is executed by the image processing chip 134 of the operational unit 130; hence, the processing workload is distributed in the information processing device 100 shown in FIG. 8 and FIG. 9 compared to the information processing device 100 shown in FIG. 1 and FIG. 2.

Below, descriptions are made of the controller chip 121 and the image processing chip 134 according to the present embodiment of the present invention.

Figure 10:
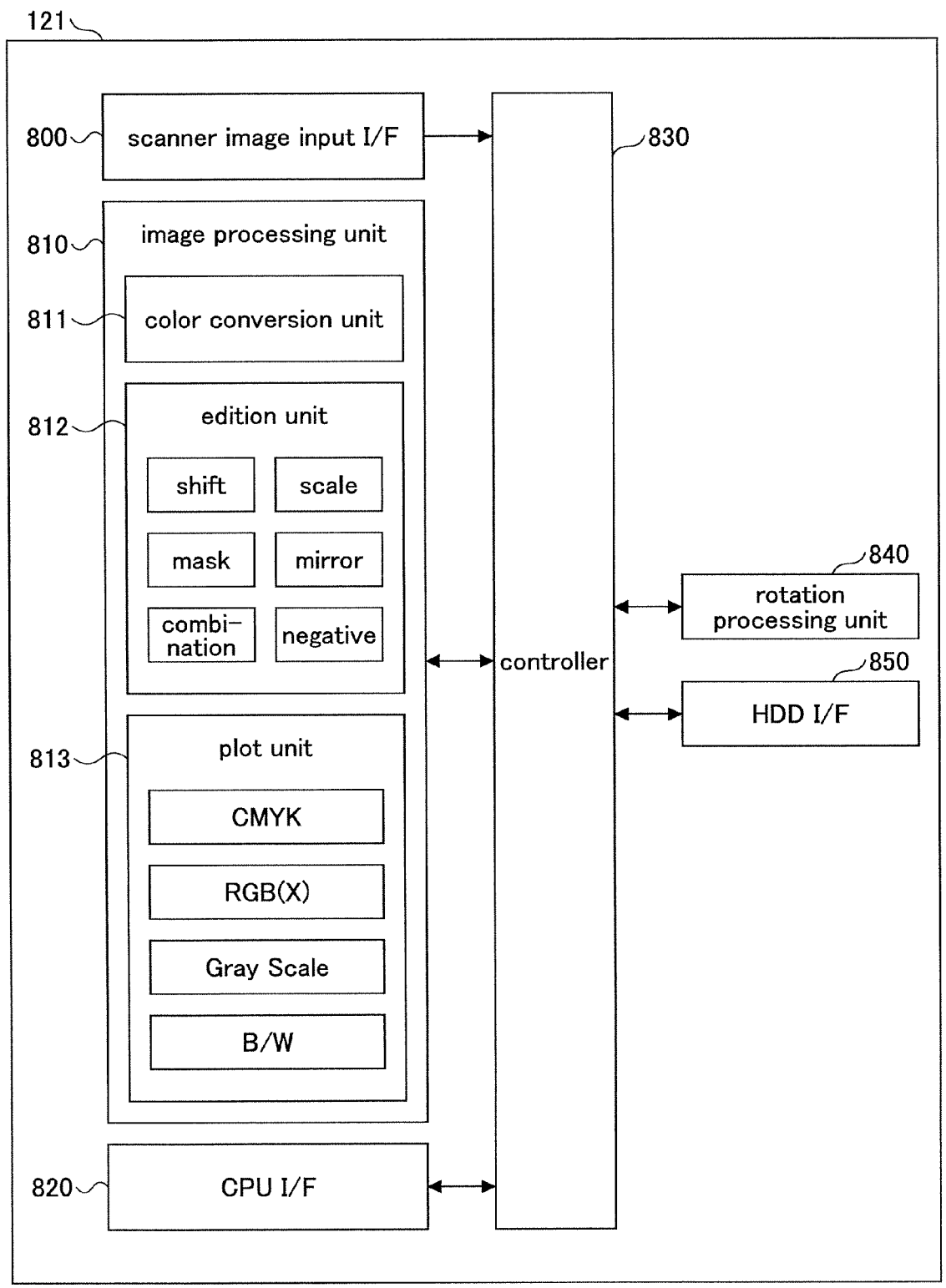
FIG. 10 is a block diagram illustrating a functional configuration the controller chip 121 according to the present embodiment of the present invention.

FIG. 10 is a block diagram illustrating a functional configuration the controller chip 121 according to the present embodiment of the present invention.

As shown in FIG. 10, the controller chip 121 includes a scanner image input interface (I/F) 800, an image processing unit 810, a CPU interface (I/F) 820, a controller 830, a rotation processing unit 840, and a HDD interface (I/F) 850.

The scanner image input interface (I/F) 800 is the interface between the controller chip 121 and the scanner image processor 112 of the engine unit 110.

The image processing unit 810 includes a color conversion unit 811, an edition unit 812, and a plot unit 813.

The color conversion unit 811 performs color conversion of an image file. The edition unit 812 performs editing of the image file. The plot unit 813 performs plotting of the image file.

The CPU interface (I/F) 820 is an interface between the controller chip 121 and the CPU 123 of the controller unit 120.

The controller 830 controls the scanner image input interface (I/F) 800, the image processing unit 810, the CPU interface (I/F) 820, a controller 830, the rotation processing unit 840, and the HDD interface (I/F) 850.

The rotation processing unit 840 performs rotation processing. The HDD interface (I/F) 850 is an interface between the controller chip 121 and the hard-disk drive (HDD) 122.

Figure 11:
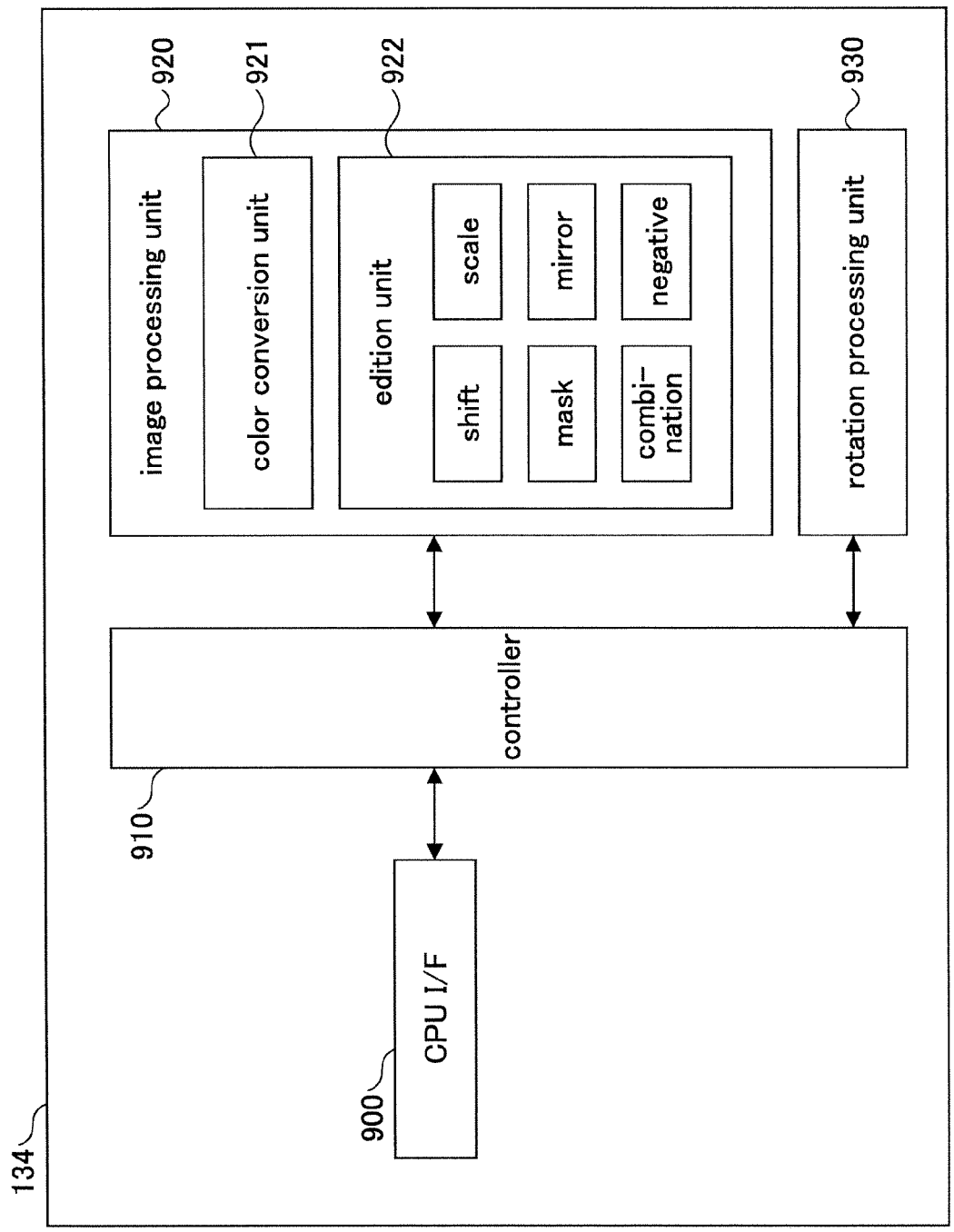
FIG. 11 is a block diagram illustrating a functional configuration of the image processing chip 134 according to the present embodiment of the present invention.

FIG. 11 is a block diagram illustrating a functional configuration of the image processing chip 134 according to the present embodiment of the present invention.

As shown in FIG. 11, the image processing chip 134 includes a CPU interface (I/F) 900, a controller 910, an image processing unit 920, and a rotation processing unit 930.

The CPU interface (I/F) 900 is an interface between the image processing chip 134 and the CPU 132 of the operational unit 130.

The controller 910 controls the CPU interface (I/F) 900, the image processing unit 920, and the rotation processing unit 930.

The image processing unit 920 includes a color conversion unit 921 and an edition unit 922.

The color conversion unit 921 performs color conversion of an image file. The edition unit 922 performs editing of the image file.

The rotation processing unit 930 performs rotation processing.

The image processing chip 134 shown in FIG. 11 has the same image processing functions of producing an output image of an input image as the controller chip 121 shown in FIG. 10. Specifically, similar to the controller chip 121 shown in FIG. 10, the image processing chip 134 shown in FIG. 11 also has the image processing unit 920 and the rotation processing unit 930.

The image processing unit 920 includes a color conversion unit 921 and an edition unit 922, which correspond to the color conversion unit 811 and the edition unit 812 of the image processing unit 810, respectively. Similar to the edition unit 812 of the image processing unit 810, the edition unit 922 has the shift function, mask function, scaling function, mirror function, negative function, and others.

With the above configuration, the image processing chip 134 has the same image processing functions of producing an output image of an input image as the controller chip 121.

With the information processing device 100 shown in FIG. 8, when the output image display procedure, the scanner input procedure, and the rotation procedure are executed in parallel, the processing workload is not concentrated on the controller chip 121 but is appropriately distributed.

FIG. 12A through FIG. 12H are diagrams illustrating the output image display procedure according to the present embodiment of the present invention.

FIG. 12A through FIG. 12H are arranged in temporal sequence. Namely, FIG. 12A corresponds to operations at the earliest time, and FIG. 12H corresponds to operations at the latest time. In addition, in FIG. 12A through FIG. 12H, in the image combination processing, two images are combined into one image (simply indicated as "2 in 1"). Namely, when displaying an output image of the "2 in 1" combination processing, an output image after two images are combined into one image is displayed.

Figure 13A:
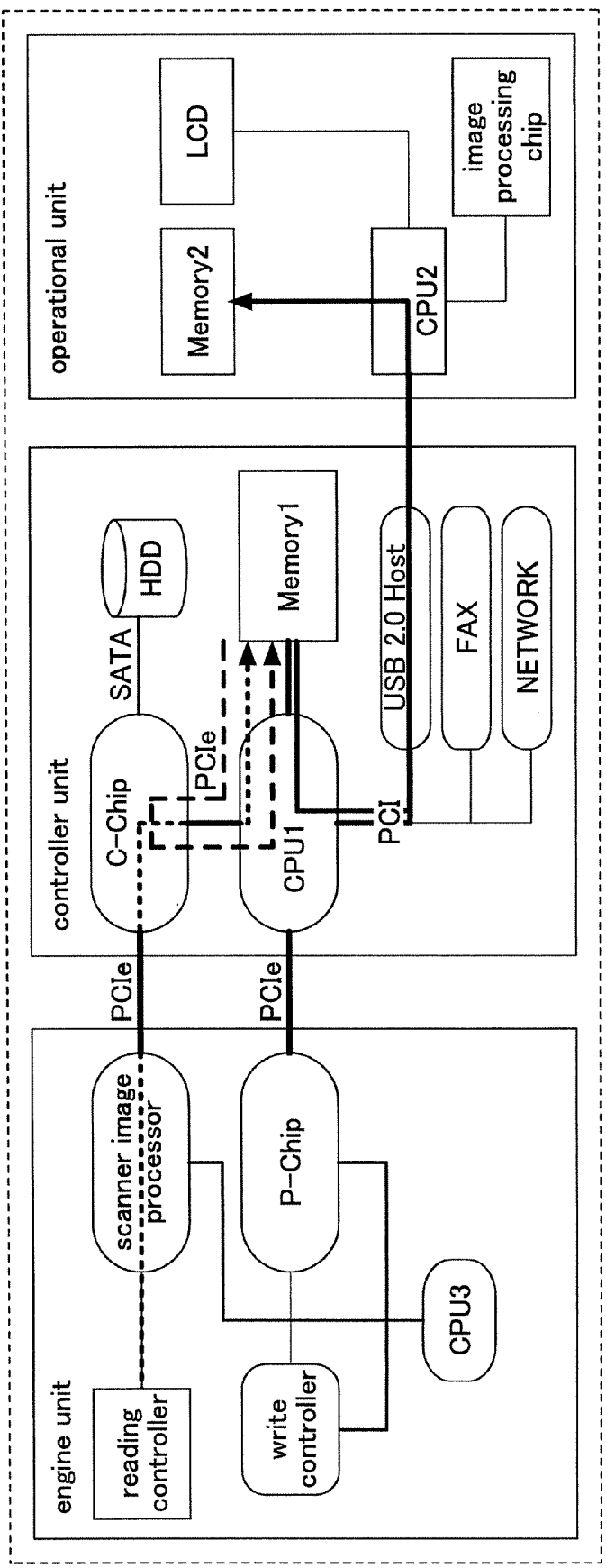
FIG. 13A through FIG. 13C are block diagrams illustrating an example of plural processing paths during parallel processing in the present embodiment.
Figure 13B:
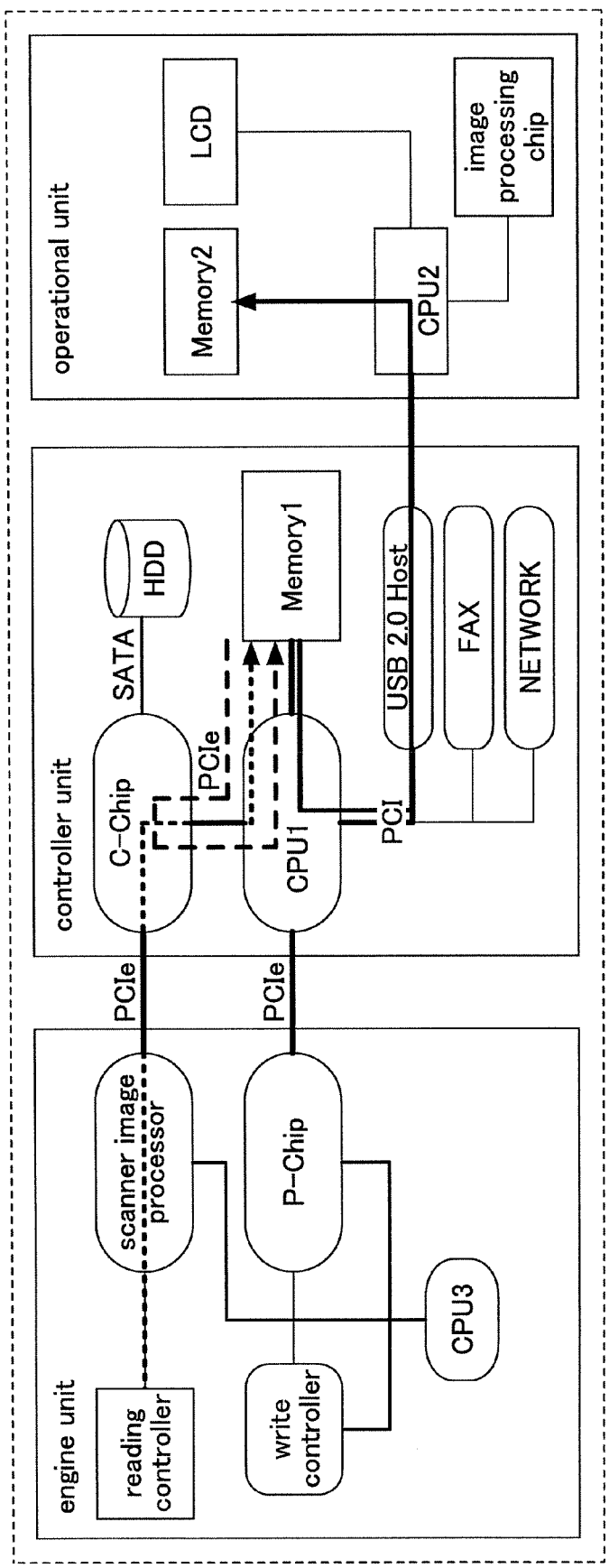
Figure 13C:
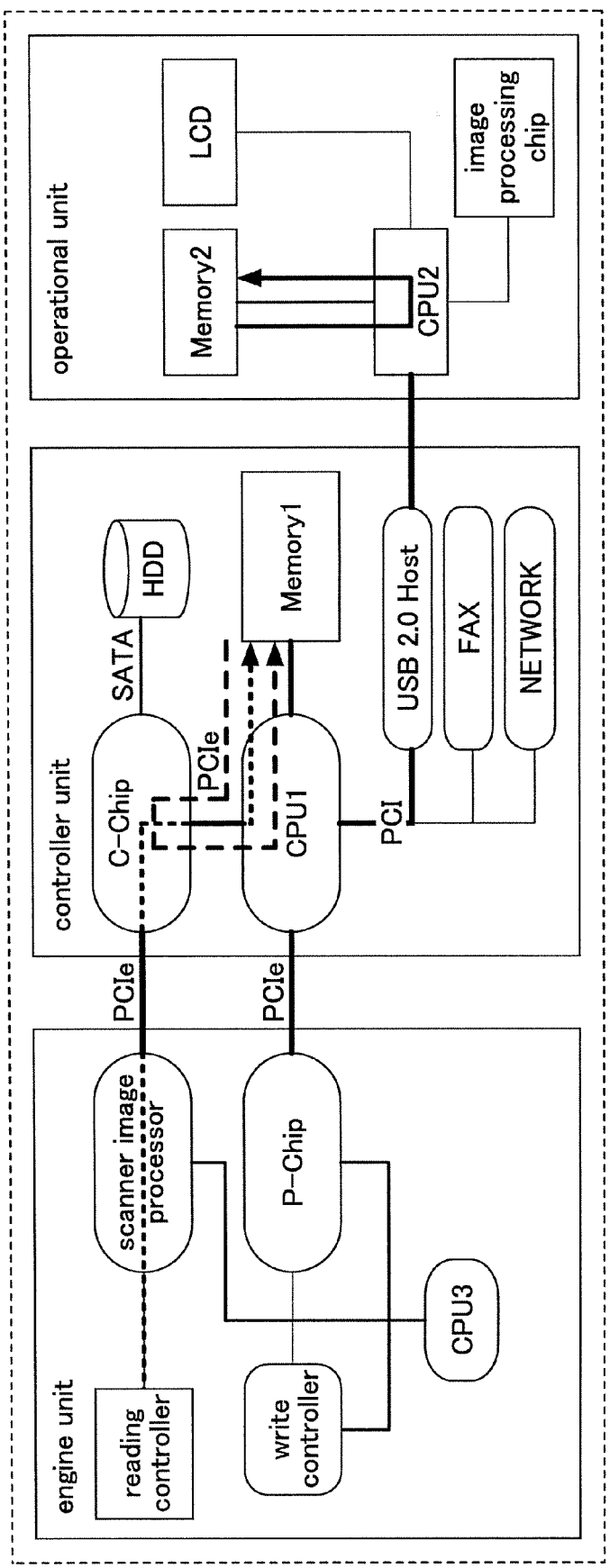

FIG. 13A through FIG. 13C are block diagrams illustrating an example of plural processing paths during parallel processing in the present embodiment.

Figure 14A:
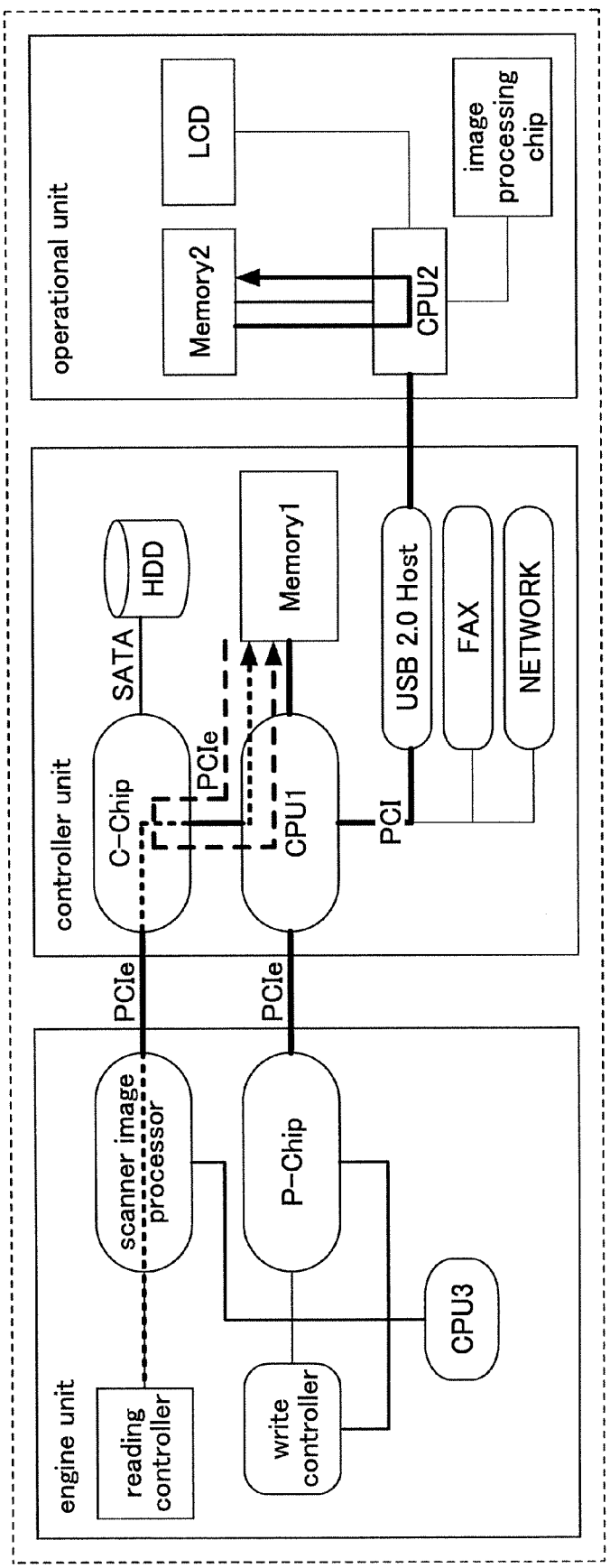
FIG. 14A through FIG. 14C, continuing from FIG. 13C, are block diagrams illustrating the example of the processing paths during the parallel processing in the present embodiment.
Figure 14B:
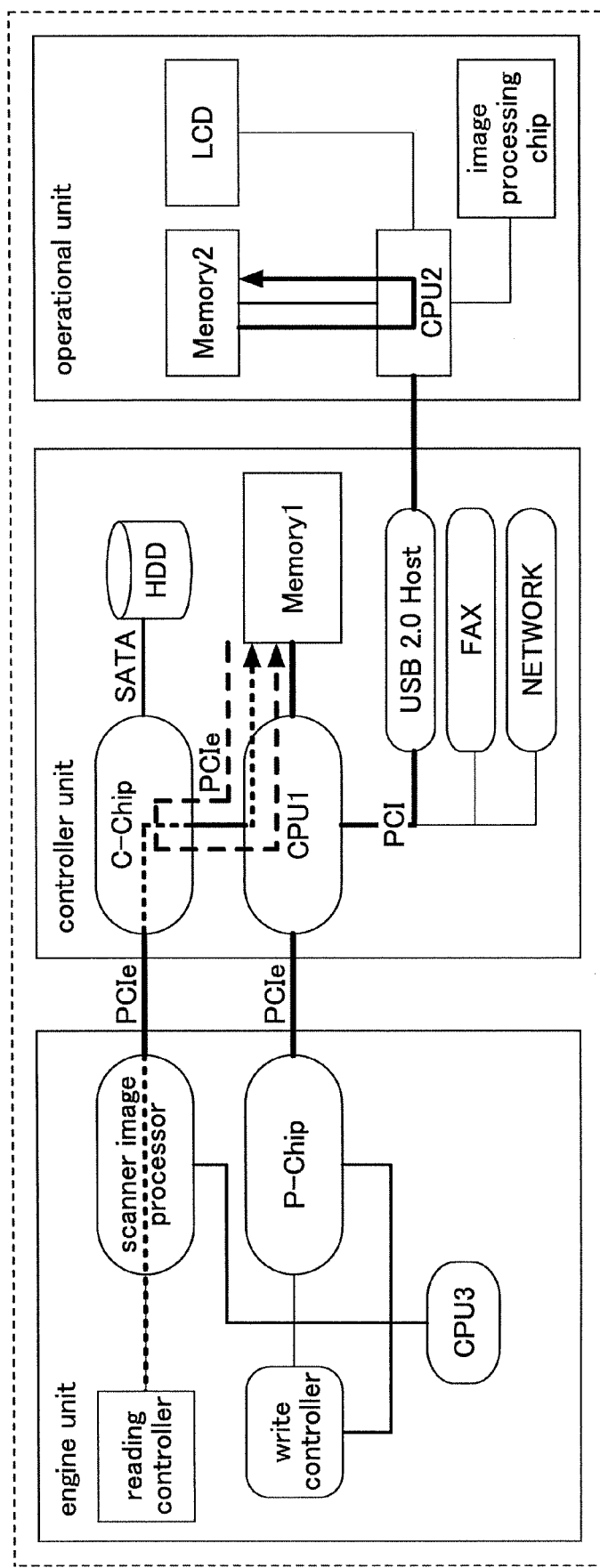
Figure 14C:
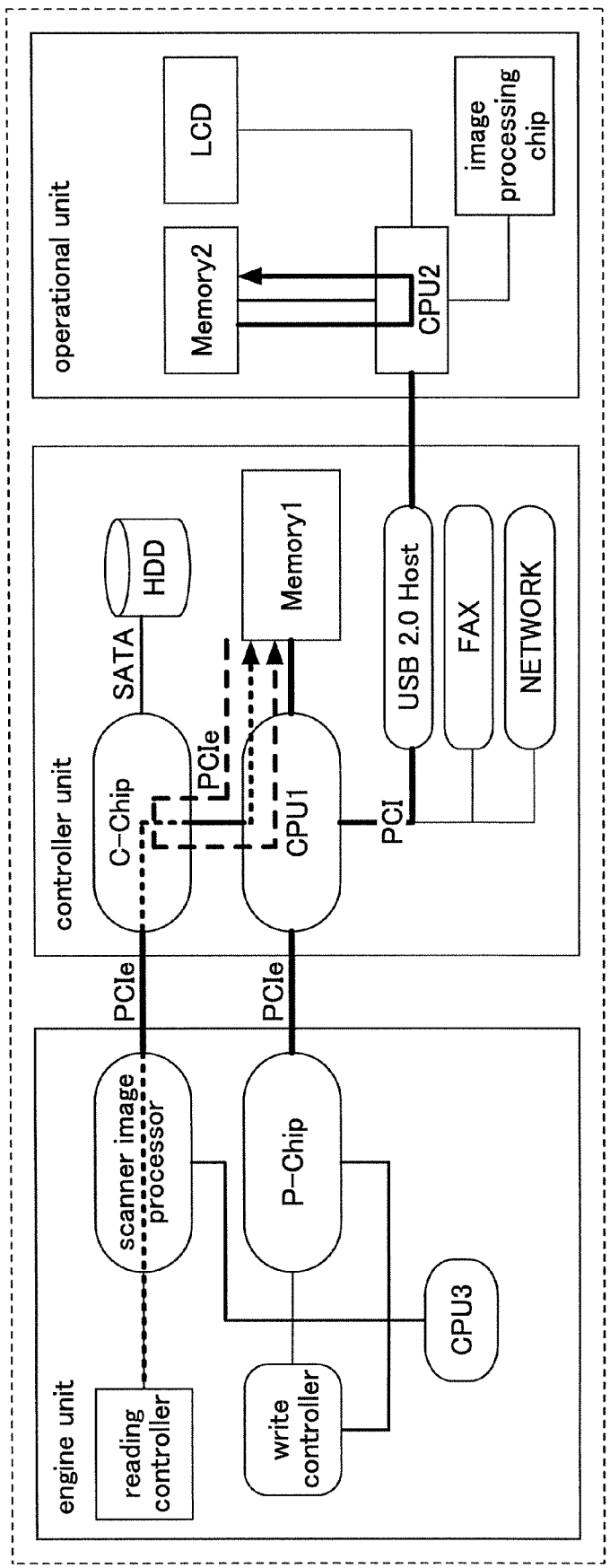

FIG. 14A through FIG. 14C, continuing from FIG. 13C, are block diagrams illustrating the example of the processing paths during the parallel processing in the present embodiment.

Figure 15A:
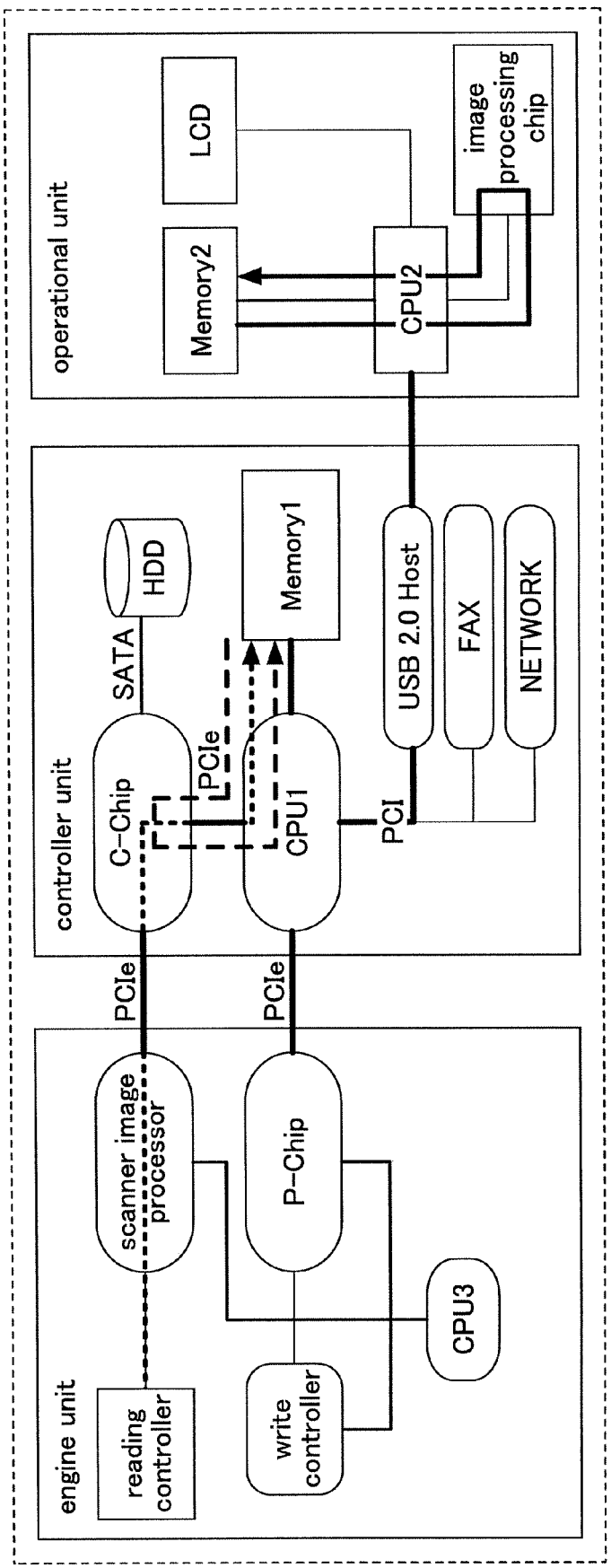
FIG. 15A and FIG. 15B, continuing from FIG. 14C, are block diagrams illustrating the example of the processing paths during the parallel processing in the present embodiment.
Figure 15B:
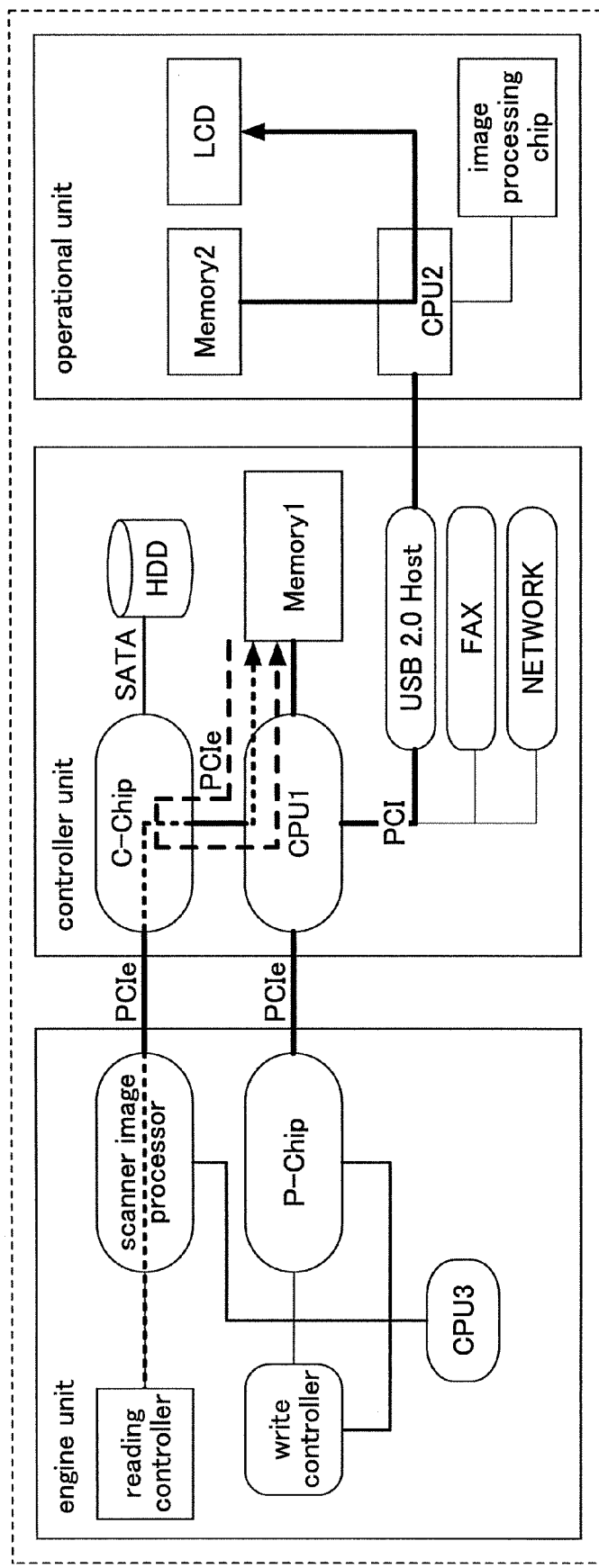

FIG. 15A and FIG. 15B, continuing from FIG. 14C, are block diagrams illustrating the example of the processing paths during the parallel processing in the present embodiment.

In FIG. 13A through FIG. 13C, FIG. 14A through FIG. 14C, and FIG. 15A through FIG. 15B, the processing path of the scanner input procedure is indicated by dotted lines, the processing path of the rotation procedure is indicated by dashed lines, and the processing path of the output image display procedure is indicated by solid lines.

The processing path of the scanner input procedure indicated by the dotted lines successively passes through the reading controller 111 and the scanner image processor 112 of the engine unit 110, and the controller chip 121, the CPU 123, and the memory 124 of the controller unit 120 in the time period from FIG. 12A to FIG. 12H.

The processing path of the rotation procedure indicated by dashed lines successively passes through the controller chip 121, the CPU 123, and the memory 124 of the controller unit 120 in the time period from FIG. 12A to FIG. 12H.

The processing path of the output image display procedure indicated by solid lines changes depending on the progress of the output image display procedure in the time period from FIG. 12A to FIG. 12H.

Next, the output image display procedure is explained with reference to FIG. 12A through FIG. 12H, FIG. 13A through FIG. 13C, FIG. 14A through FIG. 14C, and FIG. 15A and FIG. 15B.

Figure 12A:
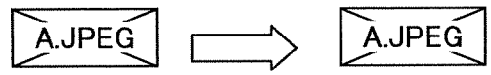
FIG. 12A through FIG. 12H are diagrams illustrating the output image display procedure according to the present embodiment of the present invention.
Figure 12B:
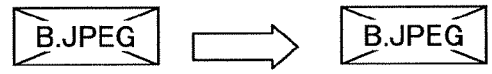

FIG. 12A and FIG. 12B illustrate an operation of sending a compressed JPEG image file from the memory 124 of the controller unit 120 to the memory 131 of the operational unit 130. The processing paths of the output image display procedure at this stage, as illustrated by solid lines in FIG. 13A and FIG. 13B, pass through the CPU 123 and the memory 124 of the controller unit 120, and the memory 131 and the CPU 132 of the operational unit 130.

Figure 12C:
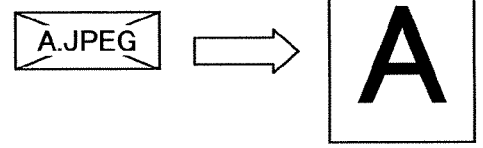
Figure 12D:
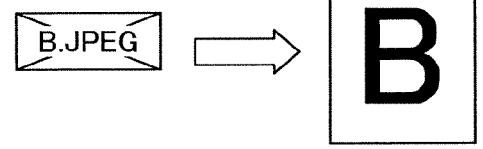

FIG. 12C and FIG. 12D illustrate an operation of decomposing the JPEG compressed image files. The processing paths of the output image display procedure at this stage, as illustrated by solid lines in FIG. 13C and FIG. 13D, pass through the memory 131 and the CPU 132 of the operational unit 130.

Figure 12E:
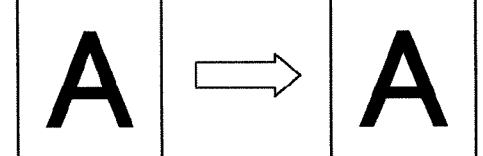
Figure 12F:
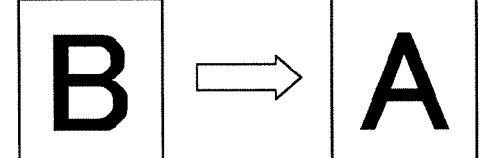

FIG. 12E and FIG. 12F illustrate an operation of combining two decomposed image files and producing the output image. The processing paths of the output image display procedure at this stage, as illustrated by solid lines in FIG. 14B and FIG. 14C, pass through the memory 131 and the CPU 132 of the operational unit 130.

Figure 12G:
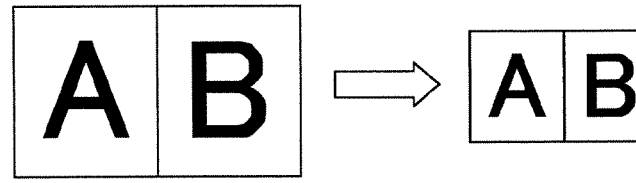

FIG. 12G illustrates an operation of reducing the size of the combined image file. The processing path of the output image display procedure at this stage, as illustrated by solid lines in FIG. 15A, passes through the memory 131, the CPU 132, the image processing chip 134 of the operational unit 130.

Figure 12H:
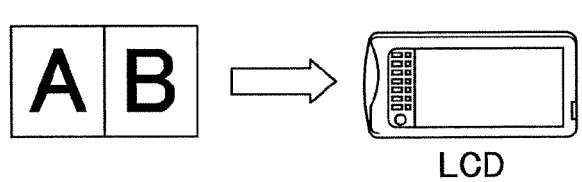

FIG. 12H illustrates an operation of displaying the reduced image file on the liquid crystal monitor (LCD) 133 of the operational unit 130. The processing path of the output image display procedure at this stage, as illustrated by solid lines in FIG. 15B, passes through the memory 131, the CPU 132, and the liquid crystal monitor (LCD) 133 of the operational unit 130.

FIG. 16A through FIG. 16H are diagrams illustrating changes with time of workloads on the CPU, the memory and the controller chip in the present embodiment.

Specifically, FIG. 16A through FIG. 16H show the magnitude of the processing workload on the controller chip 121, the CPU 123, and the memory 124 at corresponding time.

Similar to FIG. 12A through FIG. 12H, FIG. 16A through FIG. 16H are also arranged in temporal sequence, namely, FIG. 16A corresponds to operations at the earliest time, and FIG. 16H corresponds to operations at the latest time, and FIG. 16A through FIG. 16H are associated with an image combination processing, in which two images are combined into one image (namely, "2 in 1" combination).

As shown in FIG. 16A through FIG. 16H, when the output image display procedure, the scanner input procedure, and the rotation procedure are executed in parallel, the processing workloads are not concentrated on the controller chip 121 and the memory 124, but are appropriately distributed.

As described above with reference to FIG. 12A through FIG. 12H, FIG. 13A through FIG. 13C, FIG. 14A through FIG. 14C, FIG. 15A and FIG. 15B, and FIG. 16A through FIG. 16H, the information processing device 100 shown in FIG. 8 is an operational unit-centralized device, in which the output image is produced in the operational unit 130. In the information processing device 100 shown in FIG. 8, the image display processing originally performed by the controller chip 121 in the controller-centralized information processing device 100 is performed by the image processing chip 134 of the operational unit 130; thereby, even though the image display processing is of a high workload, the workload on the controller chip 121 is low. Therefore, with the information processing device 100 shown in FIG. 8, it is possible to easily perform the image display processing having a high workload.

Figure 17:
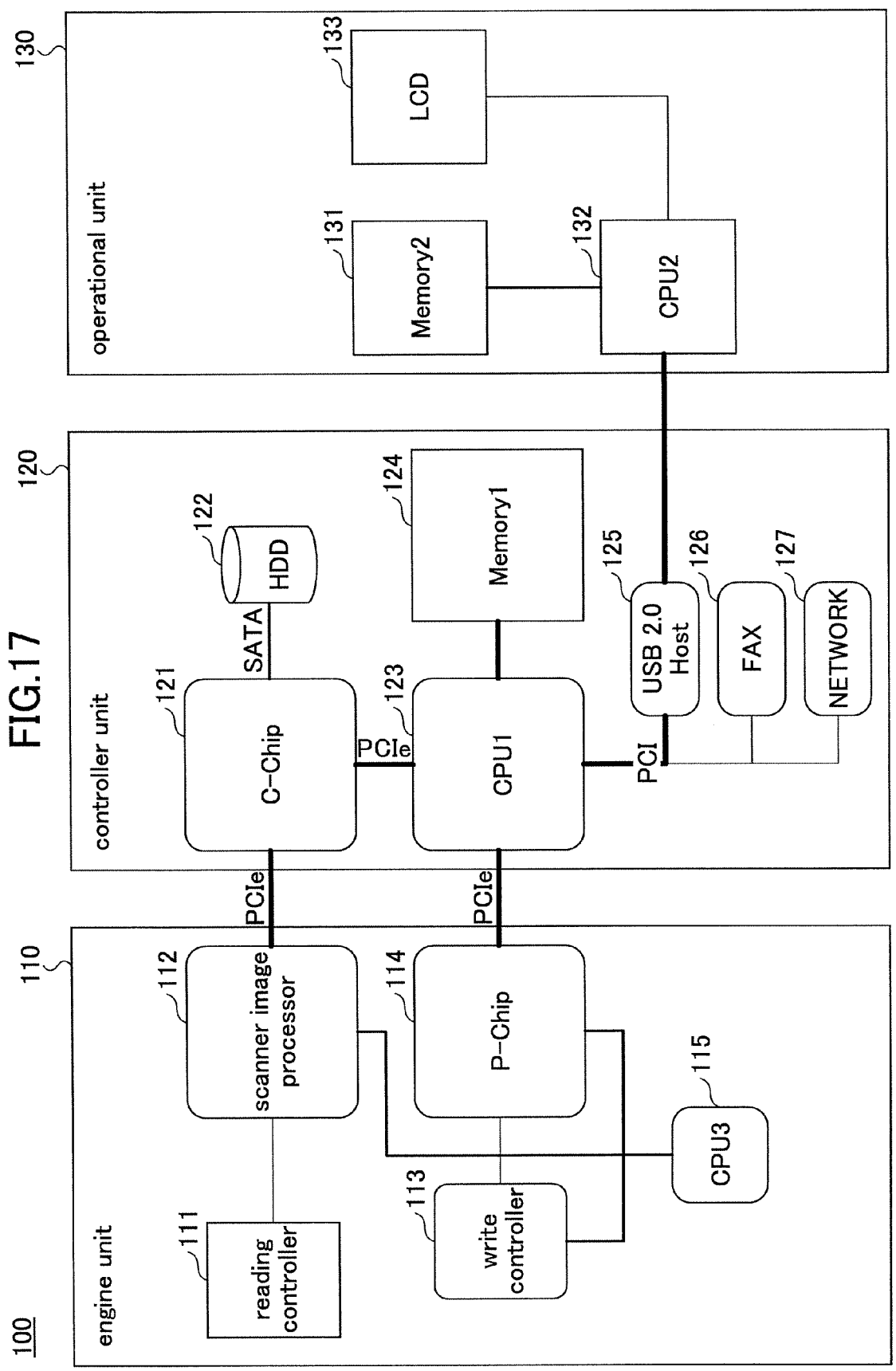
FIG. 17 is a block diagram illustrating a hardware configuration of an information processing device according to another embodiment of the present invention.

FIG. 17 is a block diagram illustrating a hardware configuration of an information processing device according to another embodiment of the present invention.

An information processing device 100 shown in FIG. 17 is basically the same as the information processing device 100 shown in FIG. 8 except that operations of the image processing unit 810 in the controller chip 121 are performed by the CPU 132 of the operational unit 130 with software; therefore the image processing chip 134 is not provided in the operational unit 130. Below, the same reference numbers are assigned to the same components as those described previously, and overlapping descriptions are omitted.

In the information processing device 100 shown in FIG. 17, the CPU 132 uses software to perform image combination, scaling (reduction and enlargement) of image size, image rotation, color conversion, stamping, and other various kinds of processing on the image files, the same as the image processing unit of the controller chip 121. Further, the information processing device 100 uses the CPU 132 to produce the output image of the original image files by using the software, and displays the output image on the liquid crystal monitor 133 for confirmation of the user.

With the information processing device 100 shown in FIG. 17, when the output image display procedure, the scanner input procedure, and the rotation procedure are executed in parallel, the processing workload is not concentrated on the controller chip 121 but is appropriately distributed.

The output image display procedure in the present embodiment is the same as that shown in FIG. 12A through FIG. 12H.

Figure 18:
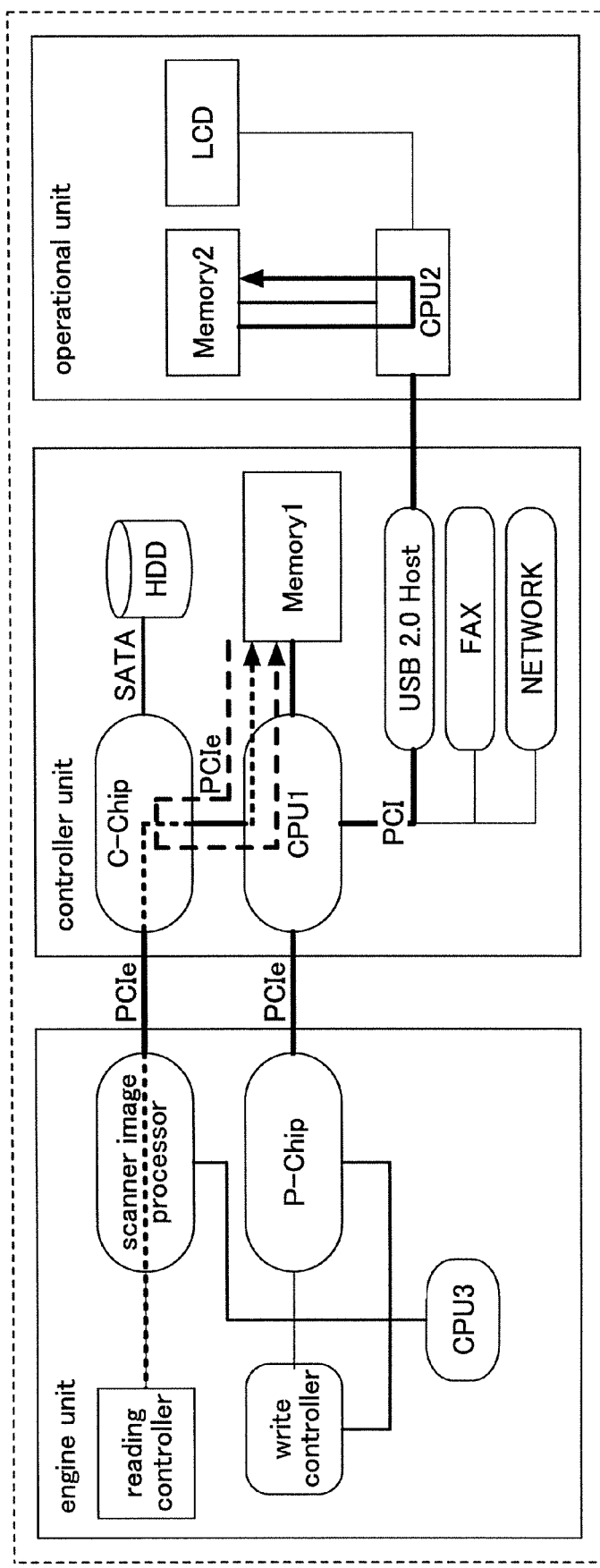
FIG. 18 is a block diagrams illustrating an example of processing paths during the parallel processing in the present embodiment, in which the CPU 132 uses software to produce the output image and display the output image on the liquid crystal monitor 133.

FIG. 18 is a block diagrams illustrating an example of processing paths during the parallel processing in the present embodiment, in which the CPU 132 uses software to produce the output image and display the output image on the liquid crystal monitor 133.

Note that FIG. 18 corresponds to FIG. 15A in the previous embodiment, and the processing paths at other timings in the present embodiment are the same as those shown in FIG. 13A through FIG. 13C, FIG. 14A through FIG. 14C, and FIG. 15B except that the image processing chip 134 is absent.

In an operation of reducing the size of the combined image file, the processing path of the output image display procedure at this stage, as illustrated by solid lines in FIG. 18, passes through the memory 131, the CPU 132, and the image processing chip 134 of the operational unit 130.

As described above, in the information processing device 100 shown in FIG. 17 and FIG. 18, when the output image display procedure, the scanner input procedure, and the rotation procedure are executed in parallel, the processing workloads are not concentrated on the controller chip 121 and the memory 124, but are appropriately distributed.

In the information processing device 100 shown in FIG. 17 and FIG. 18, the output image is produced by the CPU 132 with software. Since the image display processing originally performed by the controller chip 121 in the controller-centralized information processing device 100 is performed by the CPU 132 with software, even though the image display processing is of a high workload, the workload on the controller chip 121 is low. Therefore, with the information processing device 100 shown in FIG. 17 and FIG. 18, it is possible to easily perform the image display processing having a high workload.

Figure 19:
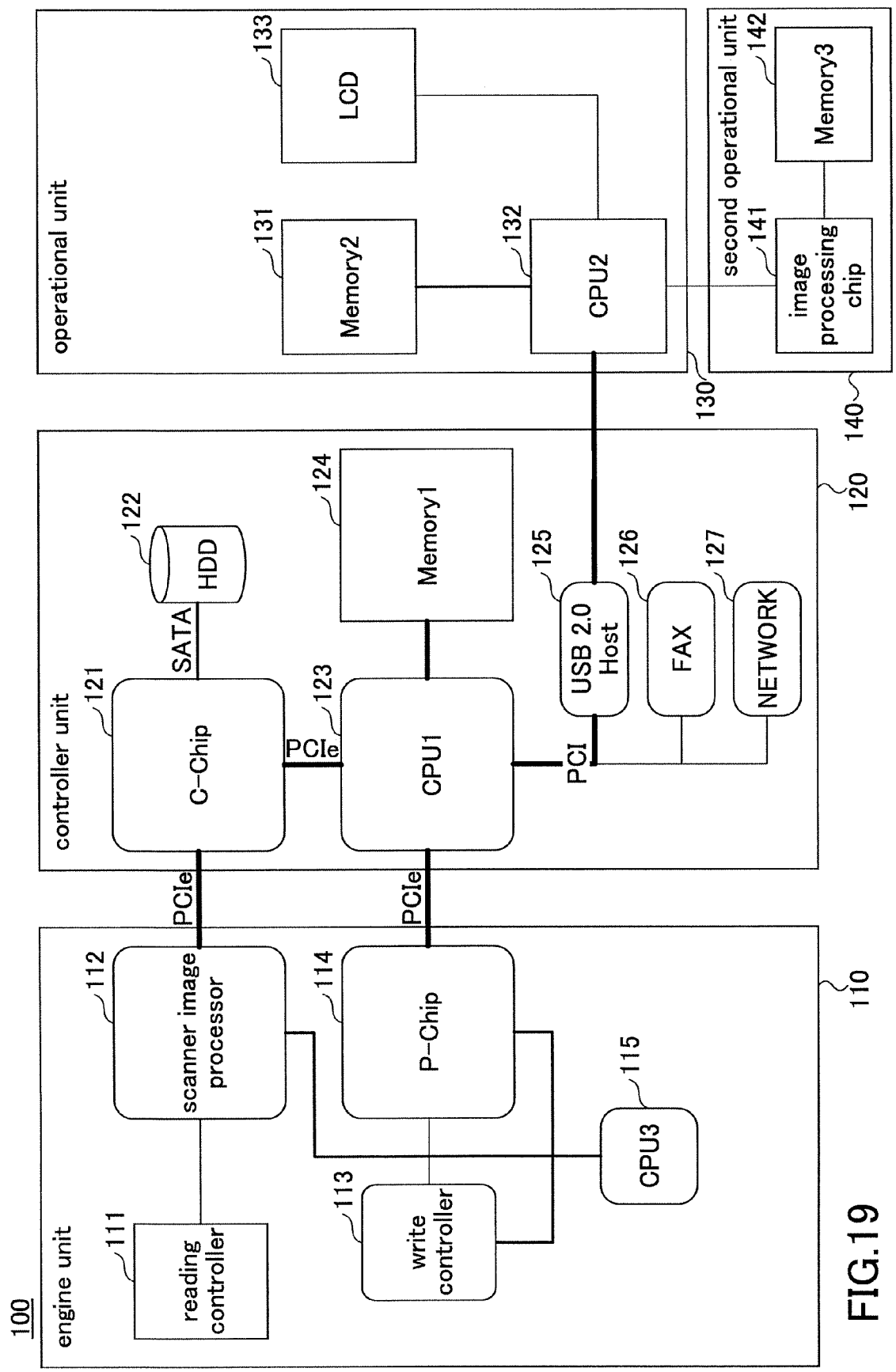
FIG. 19 is a block diagram illustrating a hardware configuration of an information processing device according to still another embodiment of the present invention.

FIG. 19 is a block diagram illustrating a hardware configuration of an information processing device according to still another embodiment of the present invention.

An information processing device 100 shown in FIG. 19 is basically the same as the information processing device 100 shown in FIG. 1 except that a second operational unit 140 is additionally connected to the operational unit 130.

The second operational unit 140 includes an image processing chip 141 and a memory 142. The image processing chip 141 performs the same image processing as that in the controller chip 121.

Below, the same reference numbers are assigned to the same components as those described previously, and overlapping descriptions are omitted.

In the information processing device 100 shown in FIG. 19, the image processing chip 141 is used to perform image combination, scaling (reduction and enlargement) of image size, image rotation, color conversion, stamping, and other various kinds of processing on the image files, the same as the image processing unit of the controller chip 121. Further, the information processing device 100 uses the image processing chip 141 to produce the output image of the original image files, and displays the output image on the liquid crystal monitor 133 for confirmation of the user.

With the information processing device 100 shown in FIG. 19, when the output image display procedure, the scanner input procedure, and the rotation procedure are executed in parallel, the processing workload is not concentrated on the controller chip 121 but is appropriately distributed.

The output image display procedure in the present embodiment is the same as that shown in FIG. 12A through FIG. 12H.

Figure 20:
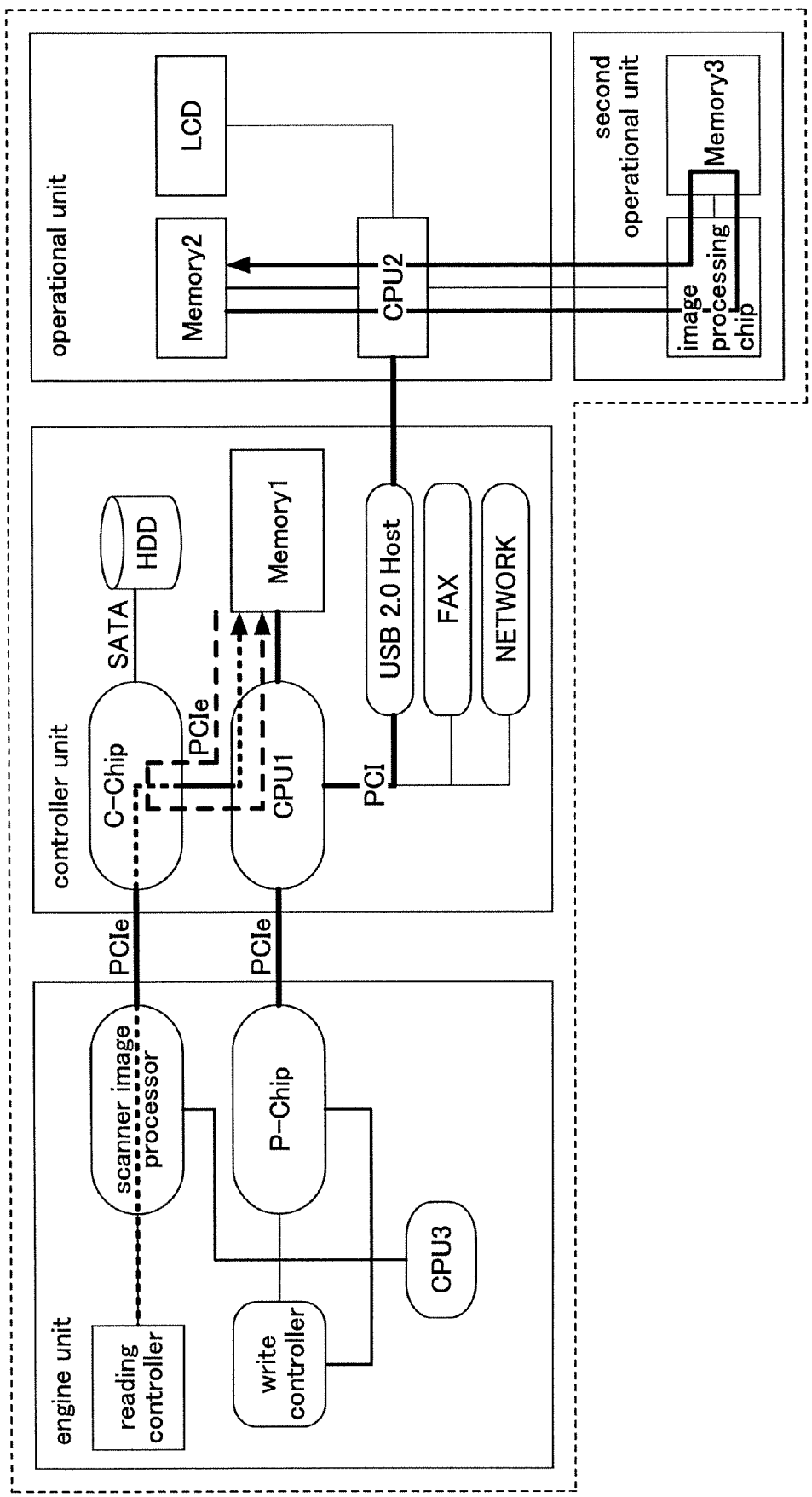
FIG. 20 is a block diagrams illustrating an example of processing paths during parallel processing in the present embodiment, in which the image processing chip 141 is used to produce the output image and display the output image on the liquid crystal monitor 133.

FIG. 20 is a block diagrams illustrating an example of processing paths during parallel processing in the present embodiment, in which the image processing chip 141 is used to produce the output image and display the output image on the liquid crystal monitor 133.

Note that FIG. 20 corresponds to FIG. 15A in the previous embodiment, and the processing paths at other timings in the present embodiment are the same as those shown in FIG. 13A through FIG. 13C, FIG. 14A through FIG. 14C, and FIG. 15B except that the image processing chip 134 is absent and the second operational unit 140 is present.

In an operation of reducing the size of the combined image file, the processing path of the output image display procedure at this stage, as illustrated by solid lines in FIG. 20, passes through the memory 131, the CPU 132, the image processing chip 141 and the memory 142 of the second operational unit 140.

In the information processing device 100 shown in FIG. 19 and FIG. 20, since the second operational unit 140 including the image processing chip 141 and the memory 142 are provided in addition to the operational unit 130, the memory 131 of the operational unit 130 can be used as a working memory for displaying images. In addition, the CPU 132 accesses the image processing chip 141 of the second operational unit 140 by register accessing.

As described above, in the information processing device 100 shown in FIG. 19 and FIG. 20, when the output image display procedure, the scanner input procedure, and the rotation procedure are executed in parallel, the processing workloads are not concentrated on the controller chip 121 and the memory 124, but are appropriately distributed.

In the information processing device 100 shown in FIG. 19 and FIG. 20, the output image is produced by the second operational unit 140. Since the image display processing originally performed by the controller chip 121 in the controller-centralized information processing device 100 is assumed by the second operational unit 140, even though the image display processing is of a high workload, the workload on the controller chip 121 is low. Therefore, with the information processing device 100 shown in FIG. 19 and FIG. 20, it is possible to easily perform the image display processing having a high workload.

According to the above embodiments, it is possible to produce the output image with the real image of the image files to be processed, and with this output image, it is possible to easily confirm the output image of processed images.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, application of the present invention, or components of the present invention, or combinations of the components of the present invention to methods, devices, systems, computer programs, recording media, and data structures are within the scope of the present invention.

Further, not only can production of an output image be performed in a unit different from the controller unit 120, other processing, such as the color conversion processing, or other processing of a high workload, can also be performed in a unit other than the controller unit 120.

This patent application is based on Japanese Priority Patent Applications No. 2006-075647 filed on Mar. 17, 2006, and No. 2007-057883 filed on Mar. 7, 2007, the entire contents of which are hereby incorporated by reference.

What is claimed is:

1. An information processing device, comprising:
   an engine unit that performs an image forming processing;
   a controller unit that controls overall operations of the information processing device; and
   an operational unit that serves as a user interface, wherein the controller unit includes
      a first memory that stores one or more image files to be transmitted to the operational unit, and
      a first calculation and processing unit that controls the overall operations of the information processing device, wherein an output image of the image files after a processing is produced in the operational unit, and the output image is displayed on a display device of the operational unit.

2. The information processing device as claimed in claim 1, wherein
   the operational unit includes:
      a second memory that stores the one or more image files transmitted from the controller unit;
      an image processing unit that produces the output image of the image files stored in the second memory after the processing on the image files; and
      a second calculation and processing unit that displays the output image on the display device of the operational unit.

3. The information processing device as claimed in claim 1, wherein
   the operational unit includes:
      a second memory that stores the one or more image files transmitted from the controller unit; and
      a second calculation and processing unit that produces the output image of the image files stored in the second memory after the processing on the image files, and displays the output image on the display device of the operational unit.

4. The information processing device as claimed in claim 1, wherein
   the operational unit includes:
      a second memory that stores the one or more image files transmitted from the controller unit;
      a second calculation and processing unit that displays, on the display device of the operational unit, the output image of the image files stored in the second memory after the processing on the image files; and
      a second image processing unit that produces the output image of the image files stored in the second memory after the processing on the image files in a unit different from the engine unit, the controller unit, and the operational unit.

5. The information processing device as claimed in claim 1, wherein the processing on the image files resulting in the output image includes at least one of combining the image files, scaling the image files, rotating the image files, and converting colors of the image files.

6. The information processing device as claimed in claim 2, wherein the second memory stores one or more compressed image files, and the image processing unit produces the output image of the image files after the processing, said image files being decompressed by the second calculation and processing unit.

7. The information processing device as claimed in claim 1, wherein the first memory stores image files input from a scanner or a facsimile machine, image files read out from a storage device, or image files obtained from a network, said image files being compressed by the first memory.

8. The information processing device as claimed in claim 7, wherein the controller unit performs two or more of a process of storing the image files input from the scanner into the first memory, a process of outputting the image files stored in the first memory to a plotter, a process of transmitting the image files stored in the first memory from the facsimile machine, and a process of transmitting the image files stored in the first memory to the network in parallel.

9. An information processing method of an information processing device including an engine unit that performs an image forming processing; a controller unit that controls overall operations of the information processing device; an operational unit that serves as a user interface, wherein the controller unit includes a first memory that stores one or more image files to be transmitted to the operational unit, and a first calculation and processing unit that controls the overall operations of the information processing device, said method comprising:

producing an output image of the image files after a processing in the operational unit; and displaying the output image on a display device of the operational unit.

10. The information processing method as claimed in claim 9, further comprising:

storing the one or more image files transmitted from the controller unit into a second memory in the operational unit; and producing the output image of the image files stored in the second memory after the processing on the image files. display device of the operational unit.

11. The information processing method as claimed in claim 9, further comprising:

storing the one or more image files transmitted from the controller unit into a second memory in the operational unit;

producing the output image of the image files stored in the second memory after the processing on the image files in a unit different from the engine unit, the controller unit, and the operational unit; and displaying the output image of the image files stored in the second memory after the processing on the image files on the display device of the operational unit.

12. The information processing method as claimed in claim 9, wherein the processing on the image files resulting in the output image includes at least one of combining the image files, scaling the image files, rotating the image files, and converting colors of the image files.

13. The information processing method as claimed in claim 10, further comprising:

producing the output image of the image files compressed and stored in the second memory in an image processing unit in the operational unit, said compressed image files stored in the second memory being decompressed by a second calculation and processing unit in the operational unit.

14. The information processing method as claimed in claim 9, wherein the first memory compresses and stores image files input from a scanner or a facsimile machine, image files read out from a storage device, or image files obtained from a network.

15. The information processing method as claimed in claim 14, wherein the controller unit performs two or more of a process of storing the image files input from the scanner into the first memory, a process of outputting the image files stored in the first memory to a plotter, a process of transmitting the image files stored in the first memory from the facsimile machine, and a process of transmitting the image files stored in the first memory to the network in parallel.

16. An information processing system, comprising:

an engine unit that performs an image forming processing;

a controller unit that controls overall operations of the information processing system; and an operational unit that serves as a user interface, wherein the controller unit includes a first memory that stores one or more image files to be transmitted to the operational unit, and a first calculation and processing unit that controls the overall operations of the information processing system, wherein an output image of the image files after a processing is produced in the operational unit, and the output image is displayed on a display device of the operational unit.

17. The information processing system as claimed in claim 16, wherein the operational unit includes:

a second memory that stores the one or more image files transmitted from the controller unit;

an image processing unit that produces the output image of the image files stored in the second memory after the processing on the image files; and a second calculation and processing unit that displays the output image on the display device of the operational unit.

18. The information processing system as claimed in claim 16, wherein the operational unit includes:

a second memory that stores the one or more image files transmitted from the controller unit; and a second calculation and processing unit that produces the output image of the image files stored in the second memory after the processing on the image files, and displays the output image on the display device of the operational unit.

19. The information processing system as claimed in claim 16, wherein the operational unit includes:

a second memory that stores the one or more image files transmitted from the controller unit;

a second calculation and processing unit that displays, on the display device of the operational unit, the output image of the image files stored in the second memory after the processing on the image files; and a second image processing unit that produces the output image of the image files stored in the second memory after the processing on the image files in a unit different from the engine unit, the controller unit, and the operational unit.

* * * * *